(12) United States Patent  (10) Patent No.: US 6,996,100 B1
Haartsen  (45) Date of Patent: Feb. 7, 2006

(54) METHOD AND SYSTEM FOR MEDIUM ACCESS ON A RADIO CHANNEL

(75) Inventor: Jacobus C. Haartsen, Hardenberg (NL)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 737 days.

(21) Appl. No.: 09/710,204

(22) Filed: Nov. 9, 2000

Related U.S. Application Data

(60) Provisional application No. 60/226,965, filed on Aug. 22, 2000, provisional application No. 60/180,095, filed on Feb. 3, 2000.

(51) Int. Cl.
*H04L 12/28* (2006.01)

(52) U.S. Cl. ...................................... 370/389; 370/450

(58) Field of Classification Search ............... 370/394, 370/349, 347, 310, 546, 912, 913, 410, 231, 370/252, 389, 390, 392, 449, 450; 455/68, 455/69, 70
See application file for complete search history.

(56) References Cited

U.S. PATENT DOCUMENTS

| | | | | |
|---|---|---|---|---|
| 4,149,142 A | * | 4/1979 | Kageyama et al. | 714/748 |
| 4,617,657 A | | 10/1986 | Drynan et al. | 370/60 |
| 4,796,255 A | | 1/1989 | Westbrook et al. | 370/100 |
| 5,222,061 A | | 6/1993 | Doshi et al. | 370/13 |
| 5,487,068 A | * | 1/1996 | Smolinske et al. | 370/450 |
| 5,544,158 A | | 8/1996 | Oprea et al. | 370/29 |
| 5,615,212 A | | 3/1997 | Ruszczyk et al. | 370/433 |
| 5,629,948 A | * | 5/1997 | Hagiwara et al. | 714/748 |
| 5,701,311 A | | 12/1997 | Kapoor | 371/32 |
| 5,715,257 A | * | 2/1998 | Matsuki et al. | 714/748 |
| 5,727,002 A | | 3/1998 | Miller et al. | 371/32 |
| 5,732,077 A | * | 3/1998 | Whitehead | 370/349 |

(Continued)

OTHER PUBLICATIONS

Jaap Haartsen; "*Bluetooth—The Universal Radio Interface For Ad Hoc, Wireless Connectivity*"; Ericsson Review No. 3; 1998; pp. 110-117.

(Continued)

*Primary Examiner*—Hassan Kizou
*Assistant Examiner*—Ricardo Pizarro

(57) ABSTRACT

A system that uses a ping pong protocol in order to remain as flexible as possible during traffic allocation includes multiple units, each of which has a unique address. A first unit transmits a first data packet including a first length indicator toward a second unit or a third unit. Each of the second unit and the third unit is operable to receive the packet and then, upon receipt of the packet, can transmit another packet. One of the units can be assigned a master unit role and is operable to restart transmission operations using priority slots. A priority slot allows a unit to transmit a packet regardless of whether it has received a packet according to the ping-pong scheme. A selective-repeat automatic retransmission query scheme provides data integrity in an error-prone communications environment. The first unit and the second unit are operable to transmit packets that include a number of segments. Upon receipt of a packet, the receiving unit transmits another packet including acknowledgment information that indicates which, if any of the segments of the received packet were successfully received by the second unit bit map (BMS) and cumulative acknowledge (CUM_ACK) fields are used to indicate which segments were incorrectly received. Segments that are not successfully received can be repeatedly transmitted with a decreasing repetition interval.

70 Claims, 11 Drawing Sheets

U.S. PATENT DOCUMENTS

| | | | |
|---|---|---|---|
| 5,737,332 A * | 4/1998 | Corrigan et al. | 370/394 |
| 5,784,362 A * | 7/1998 | Turina | 370/321 |
| 5,896,375 A | 4/1999 | Dent et al. | 370/347 |
| 6,021,124 A * | 2/2000 | Haartsen | 370/336 |
| 6,028,853 A * | 2/2000 | Haartsen | 370/338 |
| 6,330,435 B1 * | 12/2001 | Lazraq et al. | 455/412.1 |
| 6,505,034 B1 * | 1/2003 | Wellig | 455/69 |
| 6,570,857 B1 * | 5/2003 | Haartsen et al. | 370/312 |
| 6,590,895 B1 * | 7/2003 | Gupta et al. | 370/394 |
| 6,621,796 B1 * | 9/2003 | Miklos | 370/236 |
| 6,772,215 B1 * | 8/2004 | Rathonyi et al. | 709/230 |

OTHER PUBLICATIONS

Bruneel, Herwig et al. "Receiver Buffer Behavior for the Selective-Repeat ARQ Protocol". XP-000175533. pp. 129-142.

Kalia, Manish et al. "MAC Scheduling and SAR policies for Bluetooth: A Master Driven TDD Pico-Cellular Wireless System". XP-002167155. pp. 384-388.

International Search Report as completed on Aug. 10, 2001, by M. Moreno of the ISA/EP, in connection with PCT/EP01/00867.

* cited by examiner

METHOD AND SYSTEM FOR MEDIUM ACCESS ON A RADIO CHANNEL

RELATED APPLICATIONS

This application claims priority from, and incorporates herein by reference, the entire disclosure of: 1) a U.S. provisional application filed Aug. 22, 2000, entitled Method and Apparatus for Medium Access on a Radio Channel, of J. C. Haartsen, bearing Ser. No. 60/226,965; and 2) a U.S. provisional application entitled Selective-Repeat Automatic Retransmission Query (ARQ) Protocol and/or Ping Pong Protocol, of J. C. Haartsen, bearing Ser. No. 60/180,095, filed Feb. 3, 2000.

BACKGROUND OF THE INVENTION

1. Technical Field of the Invention

The present invention generally relates to data communication systems using radio equipment and, in particular, to a method and system for optimized data medium access for an ad-hoc radio channel.

2. Description of Background and Related Art

In the last decades, progress in radio and Very Large Scale Integration (VLSI) technology has fostered widespread use of radio communications in consumer applications. Portable devices, such as mobile radiotelephones, can now be produced having acceptable cost, size and power consumption.

Although wireless technology is today focused mainly on voice communications (e.g., with respect to handheld radiotelephones), this field will likely expand in the near future to provide greater information flow to and from other types of nomadic devices and fixed devices. More specifically, it is likely that further advances in technology will provide very inexpensive radio equipment, which can easily be integrated into many devices. This will reduce the number of cables currently used. For instance, radio communication can eliminate or reduce the number of cables used to connect master devices with their respective peripherals. Recently, a new air interface named Bluetooth™ was introduced to replace all cables between mobile phones, laptop computers, headsets, Personal Digital Assistants (PDAs), and so on. An introduction to the Bluetooth™ system can be found in "Bluetooth™—The universal radio interface for ad hoc, wireless connectivity," by J. C. Haartsen, Ericsson Review No. 3, 1998.

The aforementioned radio communications are based on peer communications and ad-hoc networking. This means that the system is not based on a hierarchical scheme with a fixed infrastructure of base stations and portable terminals that communicate with the base stations via radio signals. In peer communications, all units are identical. There is no centralized control that can, for example, take care of resource or connection management, or provide other support services. In ad-hoc networks, any unit can establish a connection to any other unit in range. Ad-hoc networks are usually based on peer communications. To support the cable replacement scenarios mentioned above, the data traffic over the radio interface must be very flexible. The interface must support both symmetric and asymmetric (in arbitrary direction) traffic flows. In addition, both synchronous traffic like voice as well as asynchronous traffic like web surfing must be supported. In Bluetooth™ this has been realized with a very flexible slot structure without any multi-slot frames or anything akin thereto. The time axis in Bluetooth™ is divided into slots and the units are free to allocate the slots for transmission or reception.

Radio communication systems for personal usage differ from radio systems like the public mobile phone network in that they have to operate in an unlicenced band and have to deal with uncontrolled interference. A suitable band is the ISM (Industrial Scientific and Medical) band at 2.45 GHz, which is globally available. This band provides 83.5 MHz of radio spectrum. Since independent radio connections will share the same spectrum, mutual interference cannot be prevented. In order to obtain 100% data integrity, data communication applies retransmission schemes to retransmit data packets that have been received incorrectly by the recipient.

Numerous automatic retransmission query (ARQ) schemes have been studied in the past, see for example the book "Data Networks" by Bertsekas and Gallagher, by Prentice-Hall, Inc., 1992, ISBN 0-13-201674-5. In principle, there are three types of ARQ schemes of which the others are all derivatives: the stop-and-wait, the go-back-N and the selective-repeat ARQ scheme. In the stop-and-wait scheme the next packet is only transmitted if the previous packet has been acknowledged. In the go-back-N scheme, N packets can be sent before the first packet is checked on correct reception. If not, all N packets are retransmitted irrespective of whether they were correctly received or not. In the selective-repeat ARQ scheme, only the packet that failed is retransmitted and the receiver can request specific packets to be transmitted. For practical reasons, the selective-repeat scheme is usually combined with a go-back-N scheme. The go-back-N and selective-repeat ARQ schemes can be optimized if the round-trip delay over the link is known. In most conventional communication systems, the delay is relatively constant and can be determined.

However, in the flexible radio connections intended to replace cable connections, the delay is not known and can vary considerably. If the radio system can transmit packets of variable length arbitrarily in the forward and backward directions, the delay can vary considerably from packet to packet. Therefore, the delay cannot be a parameter with which the retransmission scheme can be optimized. Moreover, a commercial radio system demands an efficient air protocol that does not pollute the radio spectrum. In particular, retransmission of packets that have already been received correctly should be prevented.

Therefore, there is a need for a data protocol for radio services that permits flexible allocation of traffic flow in both directions, is robust to errors and disturbances on a channel, and can cope with variable delay conditions. There is also a need for a data protocol for radio services that provides a ping-pong protocol suitable for use by two or more units.

SUMMARY OF THE INVENTION

A packet-based interface can accommodate packets of variable length. To make the system robust in an error-prone environment, the packet payload is divided into segments. Each segment is part of a retransmission protocol and can be retransmitted separately. A selective-repeat protocol is used that takes into account a retransmit (RX) buffer size of the recipient. Segments can be sent out of sequence, but each segment has a sequence number that indicates its original position. A cumulative acknowledge (CUM_ACK) field is used to confirm reception of all segments with a sequence number indicated in the cumulative acknowledge message. A new segment can be sent so long as its segment number minus the cumulative acknowledged sequence number does not exceed the RX buffer size.

Spectral pollution is avoided by only re-sending segments that have been received in error and by not sending segments that cannot be accepted because of buffer size limitations. Efficiency is optimized by sending the number of segments per packet such that the RX buffer remains loaded to its maximum. Segments that fail are repeated with an increasing repetition rate when they repeatedly fail, which improves the overall latency of the system. A packet can contain a length indicator in its header. Transmit/receive recovery is guaranteed by forced transmissions on priority slots, which are also sometimes referred to as reserved recovery slots.

A ping-pong protocol is based on sending of packets back and forth on a channel in which a packet header indicates the duration of the packet and implicitly indicates when the recipient can use the channel to send a packet. The ping-pong protocol is extended to more than two units by using a destination address in each packet. The destination address points to a recipient, which reads from the packet length when it is allowed to send a packet. The unit receiving a packet is given the right to send a packet after the current packet has been received by it. This is essentially a token-based concept, except that, unlike prior token systems, the token can be exchanged with any unit participating in the network.

To provide prioritization of services and to restart the ping-pong mechanism after a transmission failure, priority slots are defined. These priority slots serve as time markers that are reserved for transmissions by associated units. A unit can be assigned a priority slot, which priority slot recurs in a repetitive fashion. Only the unit associated with the priority slot is allowed to transmit on the slot. This means that the token automatically resides at the unit associated with the priority slot. This provides a way of giving units unconditional access to the channel. If the timing is such that two or more priority slots coincide, the unit with the highest priority receives the right to send.

The priority slots can be used to provide isochronous and synchronous services, since the token is provided to a unit at regular intervals. The token can either be obtained by being addressed in a received packet or by the token residing in the unit corresponding to the priority slot.

One unit of the network can be given the master unit role. The token always returns to the master unit so that the master unit can control access to channel for the other, slave, units. In addition, the master unit can have priority slots at a higher repetition rate than the slave units. The token ping-pong protocol can also be used for a broadcast channel with an acknowledgment from each slave unit. The priority slots can be used as response slots for the slave units.

BRIEF DESCRIPTION OF THE DRAWINGS

A more complete understanding of the systems and methods of the present invention may be had by reference to the following detailed description when taken in conjunction with the accompanying drawings, wherein.

DETAILED DESCRIPTION OF THE DRAWINGS

Modern data communications can be very asymmetric. For example, if Internet traffic is considered, most of the data flow is in one direction and is periodically interrupted for a short time for the return of, for example, a confirmation message. Applications such as downloading of web pages and sending e-mail with attachments, to name a few, are very asymmetric services that use more bandwidth in one direction than in the opposite direction. Digital radio systems deployed for cellular telephone service originally used symmetric air interfaces. This was appropriate for voice services which accounted for 99% of cellular traffic. In the cordless phone system known as Digital European Cordless Telecommunication (DECT), more flexibility was obtained since slots in a frame could be allocated more freely in the downlink or uplink direction. However, DECT is based on a hierarchical structure in which base stations support control and traffic channels based on slots, frames and multi-frames.

In non-hierarchical systems based on peer communications, frames and multi-frames are less appropriate. The concept of slots can be discarded altogether and a freely accessible shared medium such as wireless Ethernet can be created. However, if a radio interface is to support both asynchronous services and synchronous services, it is advantageous to retain the time slot concept. Time slots enable the implementation of efficient power-saving techniques, such as scanning the channel with a low duty cycle based on slot timing.

Figure 1:
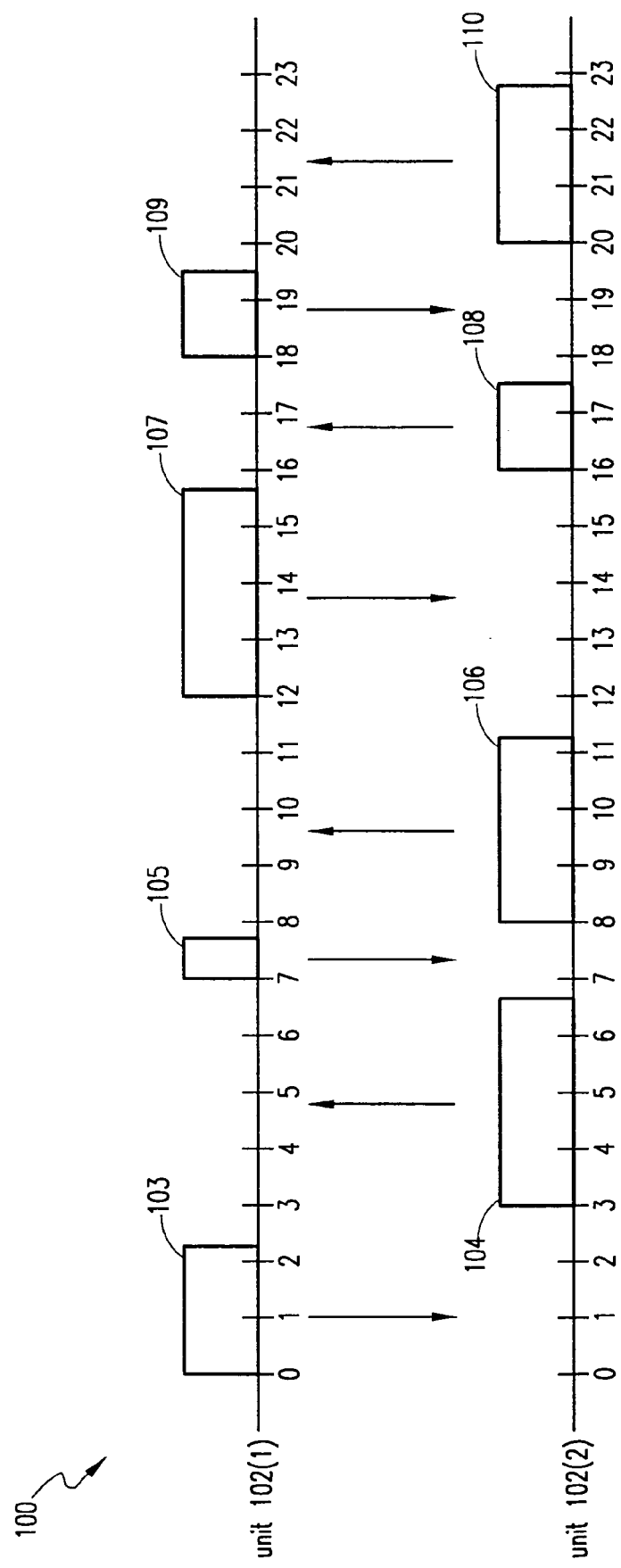
FIG. 1 illustrates a slotted time-division-duplex communication channel with flexible packet sizes in accordance with the present invention.

Reference is now made to FIG. 1, wherein there is shown a slotted time-division-duplex communication channel with flexible packet sizes in accordance with the present invention. Shown is a communication channel 100 that carries communications between a unit 102(1) and a unit 102(2). The channel 100 is shown divided into a plurality of time-division slots 0–23. Also shown are a plurality of packets 103–101 being transmitted between the unit 102(1) and the unit 102(2). Transmission of each of the packets 103–110 starts at a slot boundary but can then occupy the channel for a variable amount of time. A variation of the type of channel shown in FIG. 1 is realized in Bluetooth™, in which packet length can vary and ranges from one to five slots.

Since there is no distinct uplink or downlink in peer communications, time division duplexing (TDD) is preferably used. This means that only one unit at a time transmits while all others listen. TDD also obviates the need for expensive duplexers and allows the integration of transmitter and receiver on a single chip, since they never operate simultaneously. TDD results in cost-effective radio equipment.

Referring again to FIG. 1, the unit 102(1) first sends the packet 103 to the unit 102(2). Transmission of the packet 103 starts at the boundary of the slot 0, continues through the entirety of the slot 1, and occupies part of the slot 2. Following receipt of the packet 103, the unit 102(2) begins transmission of the packet 104 at the boundary of the next slot, the slot 3. Transmission of the packet 104 continues from the boundary of the slot 3 through the entirety of the slots 4 and 5 and part of the slot 6.

Following receipt of the packet 104, the unit 102(1) begins transmission of the packet 105 at the boundary of the next slot, the slot 7. Transmission of the packet 105 occupies only a portion of the slot 7; therefore, following receipt of the packet 105, the unit 102(2) begins transmission of the packet 106 at the boundary of the slot 8. Transmission of the packet 106 from the unit 102(2) to the unit 102(1) continues through the entirety of the packets 8, 9, and 10, and also occupies a portion of the slot 11. Following receipt of the packet 106, the unit 102(1) begins transmission of the packet 107 at the boundary of the slot 12. The packet 107 occupies the entirety of slots 12, 13, and 14, and a portion of slot 15.

Following receipt of the packet 107, the unit 102(2) begins transmission of the packet 108 at the boundary of the slot 16, the packet 108 occupying all of the slot 16 and a portion of the slot 17. Following receipt of the packet 108, the unit 102(1) transmits the packet 109 beginning at the boundary of the slot 18. The packet 109 occupies all of the slot 18 and a portion of the slot 19. Following receipt of the packet 109, the unit 102(2) begins transmission of the packet 110 at the next slot boundary, the boundary of the slot 20. The packet 110 occupies the entirety of the slots 20 and 21 and also a portion of the slot 22.

Thus, it can be seen that the slotted time-division-duplex communication channel 100 permits a unit to begin transmitting a packet at the next slot boundary following its receipt of a packet. The length of packets received or sent by the unit can vary considerably.

In certain scenarios, a network communication system is required in which there are more than two units participating on the radio channel. Random access methods like CSMA/CA could be used; however, these methods pose a problem for synchronous and isochronous services as well as for other services that must be sent with priority. Therefore, a token-bus concept applied to a radio environment is employed in an embodiment of the present invention. In the token-bus concept of the present invention, a unit obtains the right to send a packet when it has received a packet.

The packet can be regarded as carrying a token. As the packet is received, the sending unit implicitly gives the token to the receiving unit, which enables the receiving unit to send a second packet. The unit with the token can then send a third packet to any other unit in the network. Such a system is typically referred to as a token ping-pong scheme.

Figure 2:
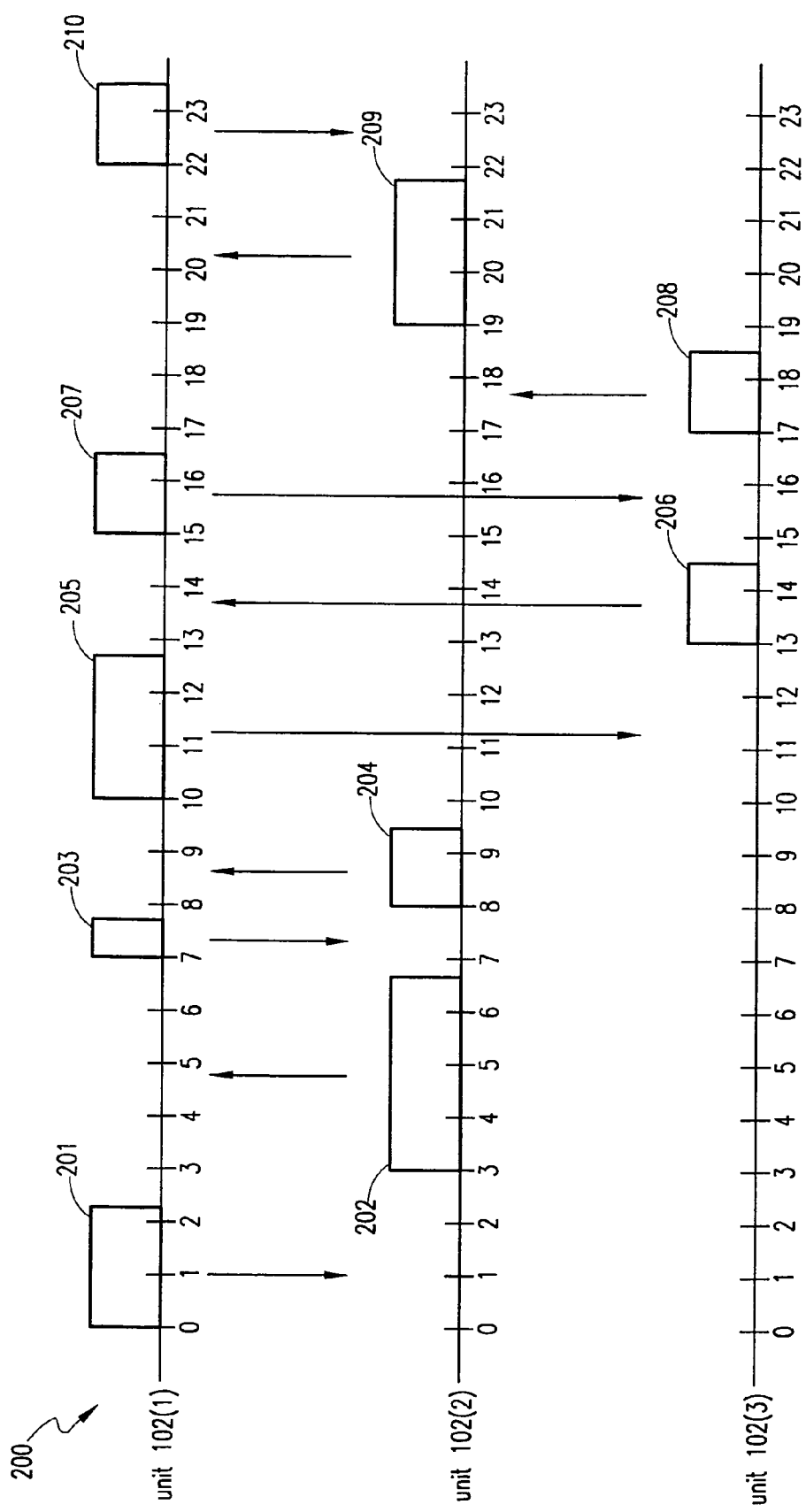
FIG. 2 illustrates exemplary operation of a token ping-pong scheme among three units in accordance with the present invention.

Reference is now made to FIG. 2, wherein there is shown a diagram illustrating exemplary operation of a token ping-pong scheme among three units in accordance with the present invention. A communication channel 200 permits communication among the unit 102(1), the unit 102(2), and unit 102(3). The channel 200 is divided into 24 time-division-duplex slots similar to those illustrated in FIG. 1. Packets 201–210 are shown being transmitted on the channel 200. As was illustrated in FIG. 1, transmission of packets begins at the boundary of a slot and can continue for a variable length of time.

The unit 102(1) begins transmission of the packet 201 at the boundary of the slot 0. The packet 201, which is being transmitted to the unit 102(2), occupies the entirety of the slot 0 and the slot 1 and part of the slot 2. Upon receipt of the packet 201, the unit 102(2) now has the token, and can transmit a packet beginning at the boundary of the slot 3. The unit 102(2) has a packet to transmit to the unit 102(1), so, at the boundary of the slot 3, the unit 102(2) begins to transmit to the unit 102(1) the packet 202. The packet 202 occupies the entirety of the slots 3–5 and part of the slot 6.

Following receipt of the packet 202, the unit 102(1) now has the token; therefore, at the boundary of the slot 7, the unit 102(1) can begin to transmit the packet 203, which is sent to the unit 102(2). The packet 203 occupies only part of the slot 7. The unit 102(2), which now has the token, can begin to transmit the packet 204 at the boundary of the slot 8. The packet 204 is transmitted to the unit 102(1) and occupies the entirety of the slot 8 and part of the slot 9.

Upon receipt of the packet 204, the unit 102(1) has the token and can begin transmission of the packet 205, which is transmitted to the unit 102(3) beginning at the boundary of the slot 10. The packet 205 occupies the entirety of the slots 10 and 11 and part of the slot 12. Following receipt of the packet 205, the unit 102(3) has the token. Therefore, the unit 102(3) can transmit the packet 206, which is transmitted to the unit 102(1), beginning at the boundary of the slot 13. The packet 206 occupies the entirety of the slot 13 and part of the slot 14. Therefore, the unit 102(1), upon receipt of the packet 206, can transmit a packet beginning at the boundary of the slot 15.

The unit 102(1) transmits the packet 207 to the unit 102(3) beginning at the boundary of the slot 15. The packet 207 occupies the entirety of the slot 15 and part of the slot 16. Upon receipt of the packet 207 by the unit 102(3), the unit 102(3) has the token and can transmit a packet beginning at the boundary of the slot 17. At the beginning of the slot 17, the unit 102(3) transmits the packet 208 to the unit 102(2). The packet 208 occupies the entirety of the slot 17 and a portion of the slot 18. Therefore, the unit 102(2) has the token and can begin transmitting a packet beginning at the boundary of the slot 19.

At the beginning of the slot 19, the unit 102(2) transmits to the unit 102(1) the packet 209. The packet 209 occupies the entirety of the slots 19 and 20 and part of the slot 21. Upon receipt of the packet 209, the unit 102(1) receives the token and can begin transmitting a packet at the boundary of the slot 22. The unit 102(1) begins transmitting the packet 210 at the boundary of the slot 22. The packet 210 occupies the entirety of the slot 22 and part of the slot 23. Upon receipt of the packet 210, the unit 102(2) has the token and can begin transmission of a packet at the boundary of the slot 24 (not shown).

Thus, FIG. 2 illustrates that, upon receipt of a packet, a unit receives the token and is permitted to transmit a packet to any other unit beginning at the boundary of the next slot following its receipt of a packet. Packets can be variable in length and thus can occupy a variable number of slots.

Figure 3:
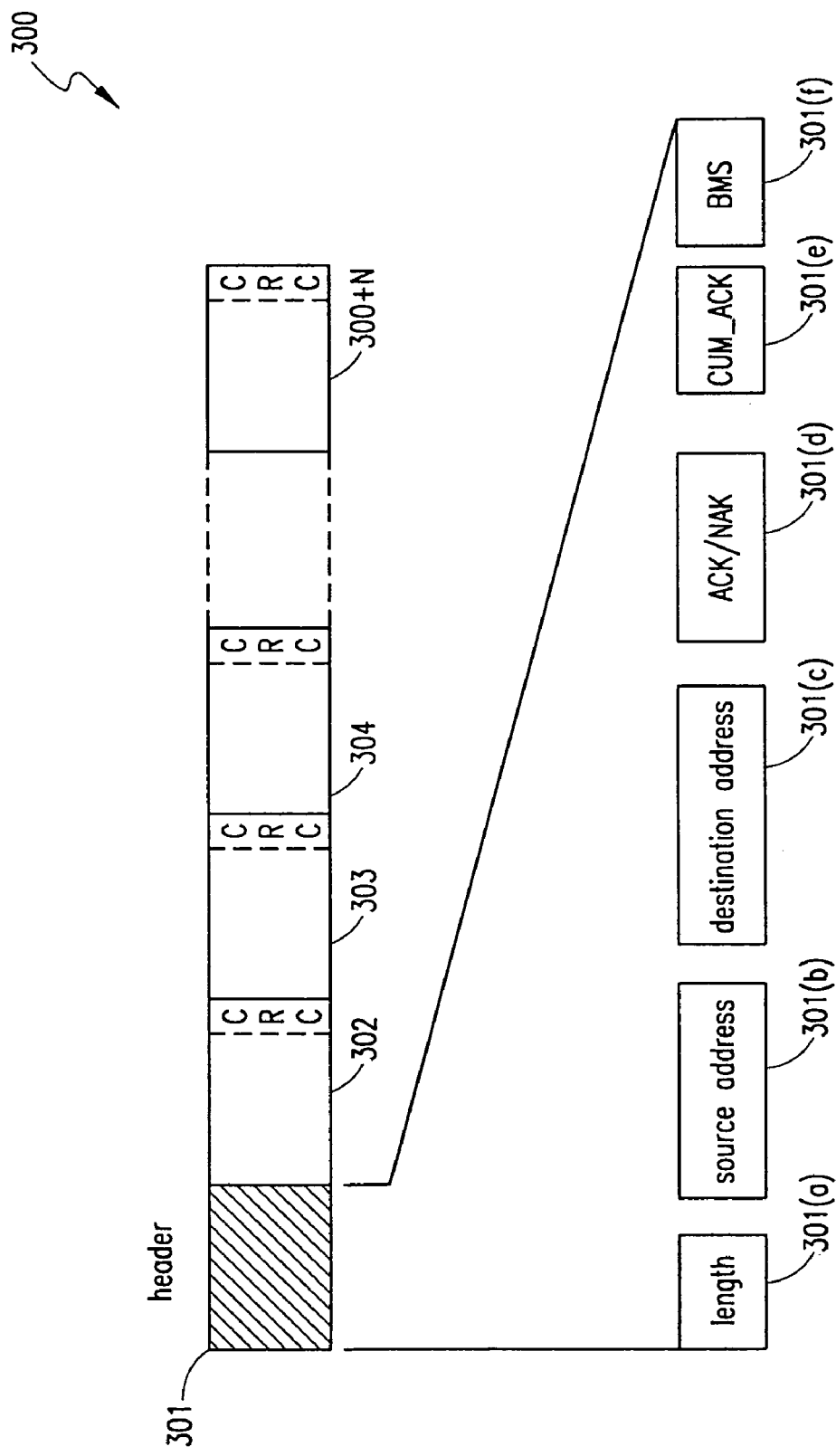
FIG. 3 illustrates an example of segmentation of a packet payload in accordance with the present invention.

Reference is now made to FIG. 3, wherein there is shown a diagram illustrating an example of segmentation of a packet payload in accordance with the present invention. When more than two units are communicating on a channel, source and destination addresses are included in the packets.

A packet 300 includes a header 301 as well as segments 302, 303 and 304–300+N, where the packet 300 includes N-1 segments. The header 301 has a length indicator 301(a), which indicates the length of the payload of the packet 300 (e.g., the number N-1 of segments or alternatively the number of bytes), a source address field 301(b), a destination address field 301(c), an automatic retransmission query (ARQ) field 301(d), a cumulative acknowledge (CUM_ACK) filed 301(e), and a bitmap (BMS) field 301(f).

The ARQ field 301(d) relates to Acknowledge/No Acknowledge (ACK/NAK) information for a destination unit. In addition to the fields 301(a)–(f), other fields for support functions can be included, but are not shown. A unit that recognizes its destination address in the destination address field 301(c) receives the total payload of the packet 300, and can then send a packet to any unit in the network beginning at the boundary of the next slot. Inclusion of a destination address in the destination address field 301(c) allows a unit to transmit a packet to a particular unit as shown in FIG. 2.

In a preferred embodiment, the payload size of the packet 300 is maximized and is limited by the retransmit (RX) buffer size L_rx. Each segment has a sequence number that counts modulo M. The sequence number can, for example, consist of 8 bits, in which case it counts modulo M=256. When a connection is established between the two units 102(1) and 102(2), they inform each other of the buffer length L_rx and L_tx of their respective receive and transmit buffers. The transmit and receive buffer length of the units 102(1) and 102(2) are respectively L_tx_102(1), L_rx_102(1), L_tx_102(2), and L_rx_102(2). Their sizes can all be different. For a selective-repeat ARQ protocol to work and so that there is no ambiguity in the sequence number when segments are sent out of order, the following equation must be satisfied:

$$M/2 \geq \max(L\_tx\_102(1), L\_rx\_102(1), L\_tx\_102(2), L\_rx\_102(2))$$

where max(X,Y) is the maximum of X and Y.

Referring again to FIG. 3, the CUM_ACK field 301(e) corresponds with the segment with the highest sequence number acknowledge. Segments with higher sequence numbers might have been received correctly, but either have not been processed, or segments with a lower sequence number (but larger than CUM_ACK) have failed and need to be retransmitted. With the CUM_ACK field 301(e), it is indicated that (re)transmission of at least segment CUM_ACK+1 is needed, the value of CUM_ACK+1 being referred to as the Request Number.

The BMS field 301(f) indicates which segments following the Request Number were received incorrectly. The BMS field 301(f) is advantageous if burst errors destroy a number of consecutive segments close to the Request Number. To reduce overhead, the packet size should be maximized, but, in order to avoid unnecessary transmissions, the packet should fit into the receive buffer of the destination unit. For transmissions from unit 102(1) to unit 102(2), the segments that can be sent by the unit 102(1) are the segments with sequence numbers from the Request Number up to a maximum SN_max given by the equation:

$$SN\_max = \min(CUM\_ACK+L\_rx\_102(2), CUM\_ACK+L\_tx\_102(1))$$

where min(X, Y) is the minimum of X and Y. Note that this formula does not take into account that CUM_ACK wraps around M; a slight modification is required to take into account the wrap-around effect, but it is apparent to persons skilled in the art.

The receive buffer in the unit 102(2) contains spaces for segments having sequence numbers of the Request Number and greater. Segments that have been received up to and including CUM_ACK have been received in sequential order and can therefore be removed from the receive buffer of the unit 102(2). However, because of the receive buffer's limited size, the largest sequence number it can hold is CUM_ACK+L_rx_102(2). The transmit buffer of the unit 102(1) must store segments with sequence numbers of the Request Number and greater. Again, the size of the transmit buffer of the unit 102(1) determines the maximum sequence number that can be stored, which is CUM_ACK+L_tx_102(1). The unit 102(1) should not (re)send all packets ranging from the Request Number up to the maximum value. Segments that already have been sent and which have not been indicated to be erroneous do not have to be retransmitted (yet). There may be other reasons why the unit 102(1) would want to restrict the number of segments sent in one packet to a value lower than the maximum value indicated, such as, for example, to conserve bandwidth or to avoid a unit transmitting on a priority slot of another unit.

ARQ response information (like the acknowledgments) is included in a return packet. For example, it can be piggy-backed in the header of the packet. It will be apparent that the round-trip delay for a segment is variable and depends on the number of segments in the packet and on the place of the segment in the payload. For example, in FIG. 1, the round-trip delay, defined as the elapsed time between transmission of a segment and its acknowledgment, varies greatly. This is because all acknowledgment information is returned at once in the packet header of the return packet. In addition, the time before the segment can be retransmitted is determined by the payload length of the return packet. This is because TDD channels have arbitrary packet sizes. ARQs that are optimized for fixed round-trip delays are therefore not appropriate for use with the present invention.

An automatic retransmission query (ARQ) protocol can be mapped onto the token ping-pong scheme of the present invention so long as the fact that the ARQ protocol is based on a point-to-point scheme is taken into account. When this is taken into account, ARQ protocol acknowledge/no acknowledge (ACK/NAK) information in packets sent between the units 102(1) and 102(2) only pertains to information exchanged between the units 102(1) and 102(2) and does not pertain to information exchanged between the units 102(1) and 102(3) or between the units 102(2) and 102(3).

For high-speed asymmetric services, packet payload length is preferably very long in order to reduce the overhead presented by the packet header and other supervisory and support signals. The payload length can occupy many slots. However, long payloads are rather vulnerable to errors. If there is only one error in the packet payload, the entire payload must be retransmitted. Therefore, it is preferable to divide the payload into multiple segments of equal length. The segments can be part of a retransmission protocol. Each segment has a sequence number that identifies the segment. In addition, each segment can be checked for errors, for example, by added Cyclic Redundancy Check (CRC) or a number of parity bits to each segment.

Figure 4:
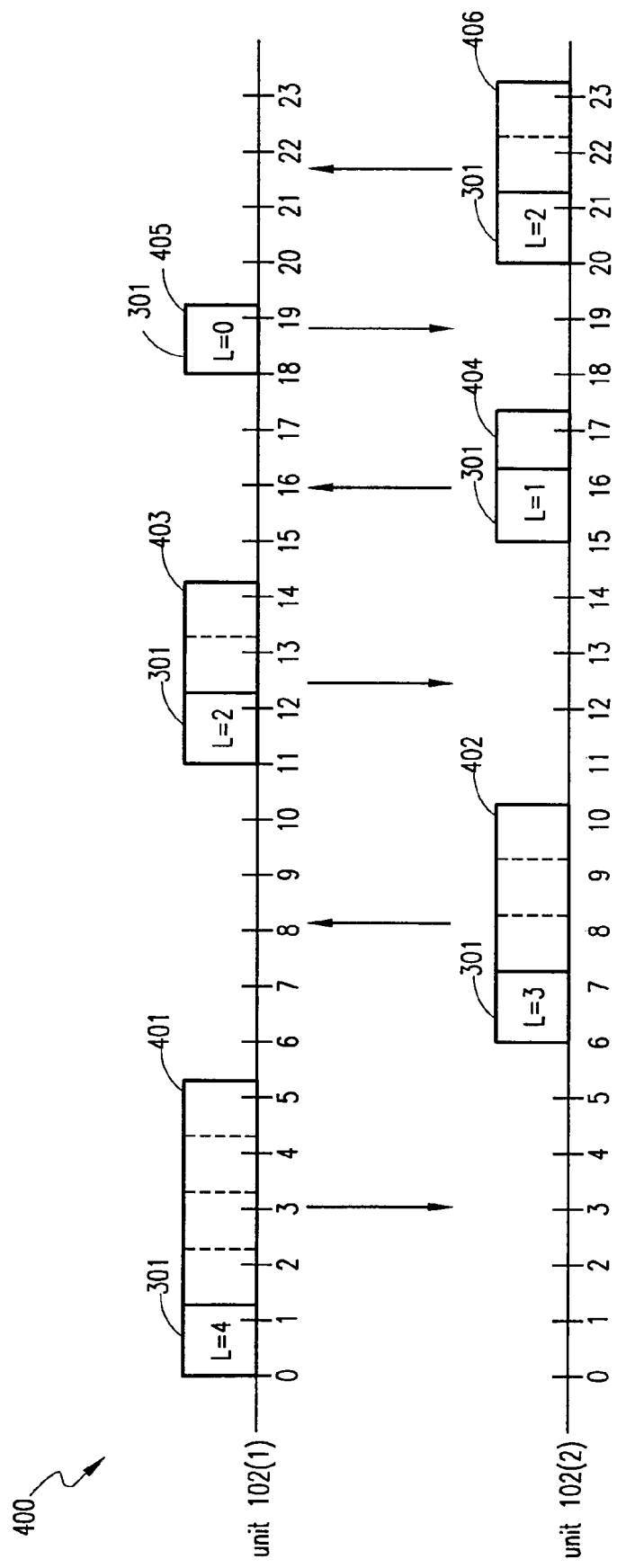
FIG. 4 illustrates exemplary flexible bandwidth allocation on a slotted channel in accordance with the present invention.

Reference is now made to FIG. 4, wherein is shown an exemplary flexible bandwidth allocation on a slotted channel in accordance with the present invention. The unit 102(1)

and the unit 102(2) are shown in communication with one another on a channel 400. Slots 0–23 are shown on the channel 400.

Initially, the unit 102(1) sends a packet 401 to the unit 102(2). The header 301 of the packet 401 includes the payload length of the packet 401 in segments (L=4). The number 4 in the header 301 of the packet 401 indicates that the payload of the packet 401 is 4 segments. Since the transmission of the packet 401 by the unit 102(1) begins at the boundary of the slot 0 and the header 301 of the packet 501 occupies the entirety of the slot 0 and part of the slot 1, the length of the packet 501 is greater than 5 but less than 6 slots. Therefore, the unit 102(2) can begin transmission of a packet at the boundary of the slot 6.

At the boundary of the slot 6, the unit 102(2) begins to transmit a packet 402 to the unit 102(1). The packet 402 has L=3; therefore, the packet 402 occupies the entirety of the slots 6–9 and part of the slot 10. Thus, the unit 102(1) can begin transmission of a packet at the boundary of the slot 11. In response to receipt of the packet 402, the unit 102(1) sends a packet 403, which has a payload L=2 and therefore occupies the entirety of the slots 11–13 and part of the slot 14. The unit 102(2) responds to the unit 102(1) by sending a packet 404 on the slots 15–16 and a portion of the slot 17. The payload of the packet 404 is L=1.

At the boundary of the slot 18, the unit 102(1) begins to send a packet 405 to the unit 102(1). The packet 405 has L=0, indicating that it has no payload. Thus the packet 405 consists only of a header 301. The packet 405 occupies all of the slot 18 and part of the slot 19; therefore, the unit 102(2) can begin transmission of a packet at the boundary of the slot 20. The unit 102(2) begins to transmit a packet 406, which has L=2, at the boundary of the slot 20. The packet 406 occupies the entirety of the slots 20–22 and part of the slot 23.

FIG. 4 illustrates how the length of a packet can be determined by a recipient by including the payload length of the packet in the packet header 301. Since the present invention concerns peer communications, each unit must be prevented from simultaneously attempting to transmit; rather, each unit must listen and wait for the other. For example, when the length field L is interpreted incorrectly, the recipient could start to transmit too early. To prevent deadlock and to provide TX/RX recovery, a slot structure and priority slots can be used. A packet transmission always starts at a slot boundary. A receiving unit only has to scan the boundary of the slot in order to determine whether or not there is a transmission. If there is no transmission for the receiving unit, the receiving unit can return to sleep until the next slot boundary.

Interference can interrupt the alternate transmit/receive operation. For example, when a header of a packet is lost, traffic flow may stagnate. Therefore, the transmit/receive (TX/RX) operation is periodically restarted at fixed slot locations using priority slots. In an embodiment of the present invention, any of the units can be assigned a master unit role during connection setup. The unit that must transmit the most data is preferably the master unit. The master unit starts a packet transmission every time slot TS for which its slot number TS follows:

$$TS \text{ modulo } M1 = \text{offset}$$

where offset is an arbitrary integer (counts in slot times). This means that every M1 slots, the TX/RX operation restarts.

Figure 5:
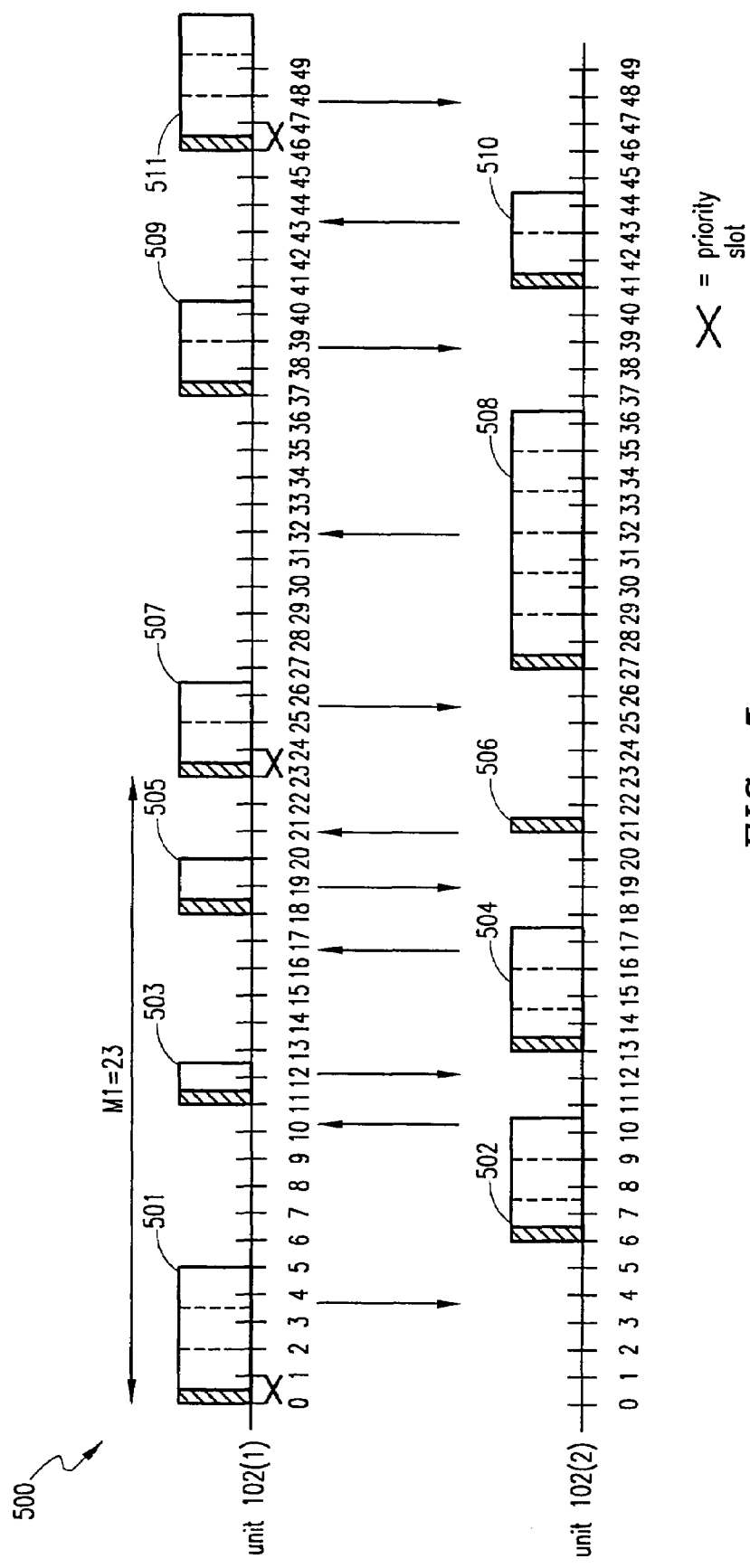
FIG. 5 illustrates exemplary RX/TX recovery using priority slots in accordance with an embodiment of the present invention.

Reference is now made to FIG. 5, wherein is shown an exemplary RX/TX recovery using priority slots in accordance with the present invention. In FIG. 5, the unit 102(1) is a master unit. If the unit 102(1) does not have information to send, it simply sends a packet without a payload that includes only the header 301 containing CUM_ACK in the CUM_ACK field 301(e). In the interval of M1 time slots, the transmission protocol is just the ping-pong protocol as presented above with respect to FIGS. 1, 2 and 4. Since both units know the location of the priority slots, they can schedule traffic to use the priority slots in the proper way (i.e., the master starts transmission and the slave listens in the priority slots).

In FIG. 5, a channel 500 is shown, on which the unit 102(1) and the unit 102(2) are communicating. The channel 500 contains slots 0–49. The unit 102(2) is a slave unit. The slots 0, 23, and 46 are priority slots, since M1=23, meaning that every twenty-three slots a priority slot occurs. Each of the priority slots 0, 23, and 46 is marked with an X on the channel 500 adjacent to the unit 102(1). The header 301 of each packet is indicated by cross-hatching.

Initially, the unit 102(1) sends a packet 501 to the unit 102(2), transmission of the packet 501 beginning at the boundary of the slot 0, the slot 0 being a priority slot. Between the priority slot 0 and the priority slot 23, the unit 102(2) sends a packet 502 to the unit 102(1), the unit 102(1) responds by sending a packet 503 to the unit 102(2), the unit 102(2) responds by sending a packet 504 to the unit 102(1), the unit 102(1) responds by sending a packet 505 to the unit 102(2), and the unit 102(2) responds by sending a message 506 to the unit 102(1), all of these packets being sent in accordance with the ping-pong protocol illustrated with respect to FIGS. 1, 2 and 4.

At the beginning of the next priority slot, which is the slot 23, the transmit/receive (TX/RX) operation restarts with the master unit, the unit 102(1), sending a packet 507 to the unit 102(2). The unit 102(2) responds to the unit 102(1) by sending a packet 508. The unit 102(1) responds to the unit 102(2) by sending a packet 509. In response to receipt of the packet 509, the unit 102(2) sends a packet 510 to the unit 102(1). The messages 508–510 are all sent in accordance with the ping-pong protocol illustrated with respect to FIGS. 1, 2 and 4. At the boundary of the slot 46, which is the next priority slot, the master unit, the unit 102(1), sends a packet 511 to the unit 102(2).

FIG. 5 illustrates that when a priority slot occurs, the unit 102(1) can transmit a packet irrespective of whether it has received a packet according to the ping-pong protocol. Thus, every M1=23 time slots, a priority slot occurs, which allows the master unit, the unit 102(1), to transmit a packet irrespective of whether it has received a packet from another unit, such as the unit 102(2).

Figure 6:
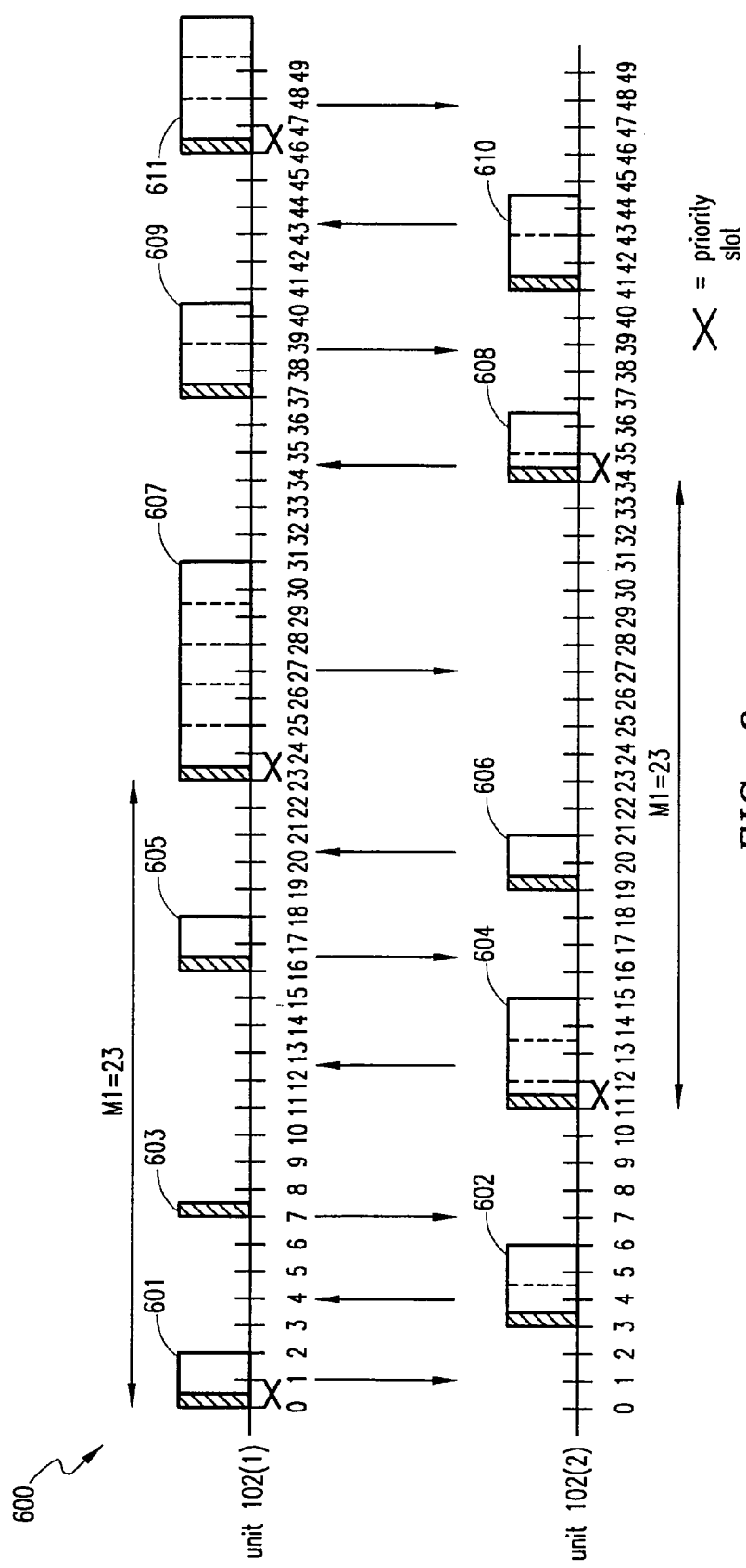
FIG. 6 illustrates exemplary RX/TX recovery using priority slots in accordance with a second embodiment of the present invention.
Figure 9:
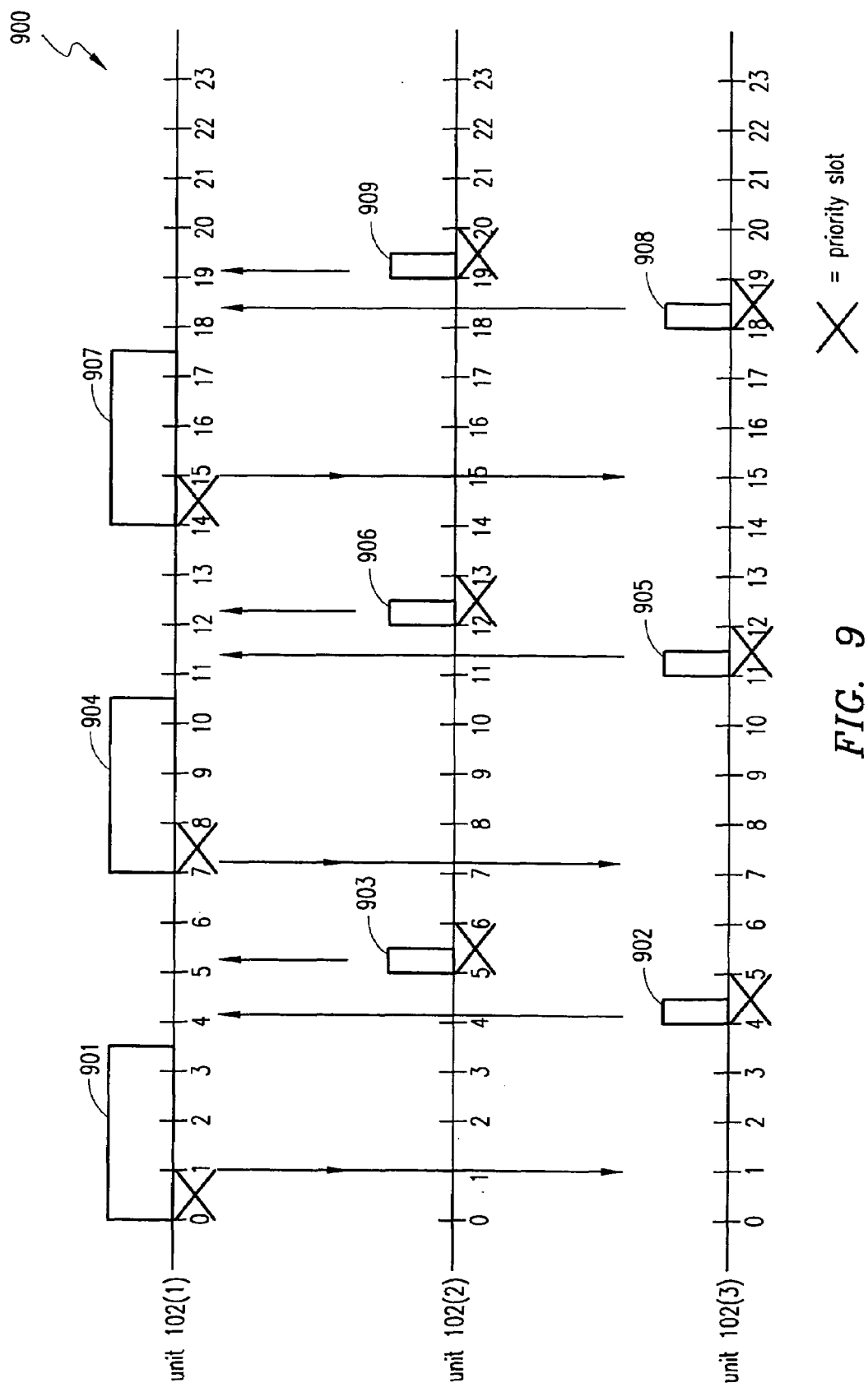
FIG. 9 illustrates an exemplary token ping-pong scheme in a broadcast service according to the present invention.

Reference is now made to FIG. 6, wherein is shown exemplary TX/RX recovery using priority slots in accordance with another embodiment of the present invention. In the present embodiment of the present invention, there is no master unit. Instead, each unit has priority slots on which it can unconditionally start transmission. To ensure as much flexibility in instantaneous bandwidth allocation as possible, the priority slots of the units 102(1) and 102(2) should be time-staggered. FIG. 6 illustrates an exemplary scheme in which unconditional transmissions can occur on $$TS \text{ modulo } M1 = \text{offset for unit } 102(1)$$

$$TX \text{ modulo } M1 = \text{offset} + INT(M1/2) \text{ for unit } 102(2)$$

where INT(X) means the largest integer value smaller than X. The offset need not be set to M1/2, but can be set to other values, such as, for example, is illustrated in FIG. 9 herein below. Units should preferably adjust their traffic scheduling to take into account the priority slot allocations.

In FIG. 6, a channel 600 is shown, on which the unit 102(1) and the unit 102(2) are communicating. The channel 600 includes slots 0–49. Neither the unit 102(1) nor the unit 102(2) is a master unit. M1=23 for both the unit 102(1) and the unit 102(2). The priority slots for the unit 102(1) are the slots 0, 23, and 46, meaning that the unit 102(1) can transmit unconditionally on those slots. Similarly, the slots 11 and 34 are priority slots for the unit 102(2), meaning that the unit 102(2) can transmit unconditionally on those slots. Initially the unit 102(1) begins to send a packet 601 to the unit 102(2) at the boundary of the slot 0, which is a priority slot. The unit 102(2) responds to the unit 102(1) by sending a packet 602 to the unit 102(1). The unit 102(1) responds to the unit 102(2) by sending a packet 603.

At the beginning of the slot 11, which is a priority slot for the unit 102(2), the unit 102(2) sends a packet 604 to the unit 102(1). Because the slot 11 is a priority slot for the unit 102(2), the unit 102(2) can begin to transmit a packet at the boundary of the slot 11 even if the unit 102(2) would not otherwise be allowed to do so according to the ping-pong protocol. The unit 102(1) responds to the unit 102(2) by sending a packet 605. The unit 102(2) responds to the unit 102(1) by sending a packet 606.

At the boundary of the slot 23, which is a priority slot for the unit 102(1), the unit 102(1) sends a packet 607 to the unit 102(2). Next, at the beginning of the slot 34, which is a priority slot for the unit 102(2), the unit 102(2) sends a packet 608 to the unit 102(1). The unit 102(1) responds to the unit 102(2) by sending a packet 609. In response, the unit 102(2) sends a packet 610 to the unit 102(1). Next, at the boundary of the slot 46, the unit 102(1) sends a packet 611 to the unit 102(2).

Thus, it can be seen that priority slots can be assigned to each unit and that when a priority slot for a particular unit is reached by that particular unit, the unit can transmit a packet, even if the unit would not otherwise be able to do so according to the ping-110 pong protocol. Priority slots for more than one unit are preferably time-staggered to avoid a unit transmitting on a priority slot of another unit.

In an error-free environment, the restart caused by priority slots may add wasteful overhead, since it restricts the free traffic flow in a certain sense. Therefore, M1 may be increased or decreased dynamically depending on the error conditions. When there are many disturbances, the channel may be restarted more often and M1 can be decreased. When there are no disturbances, M1 can be increased, which results in less frequent restarting.

The adaptation of M1 can be achieved in two ways. First, the units may inform each other of the change using the radio channel. The adaption of M1 can also be achieved automatically, provided the restart period is based on an absolute time value.

Figure 7:
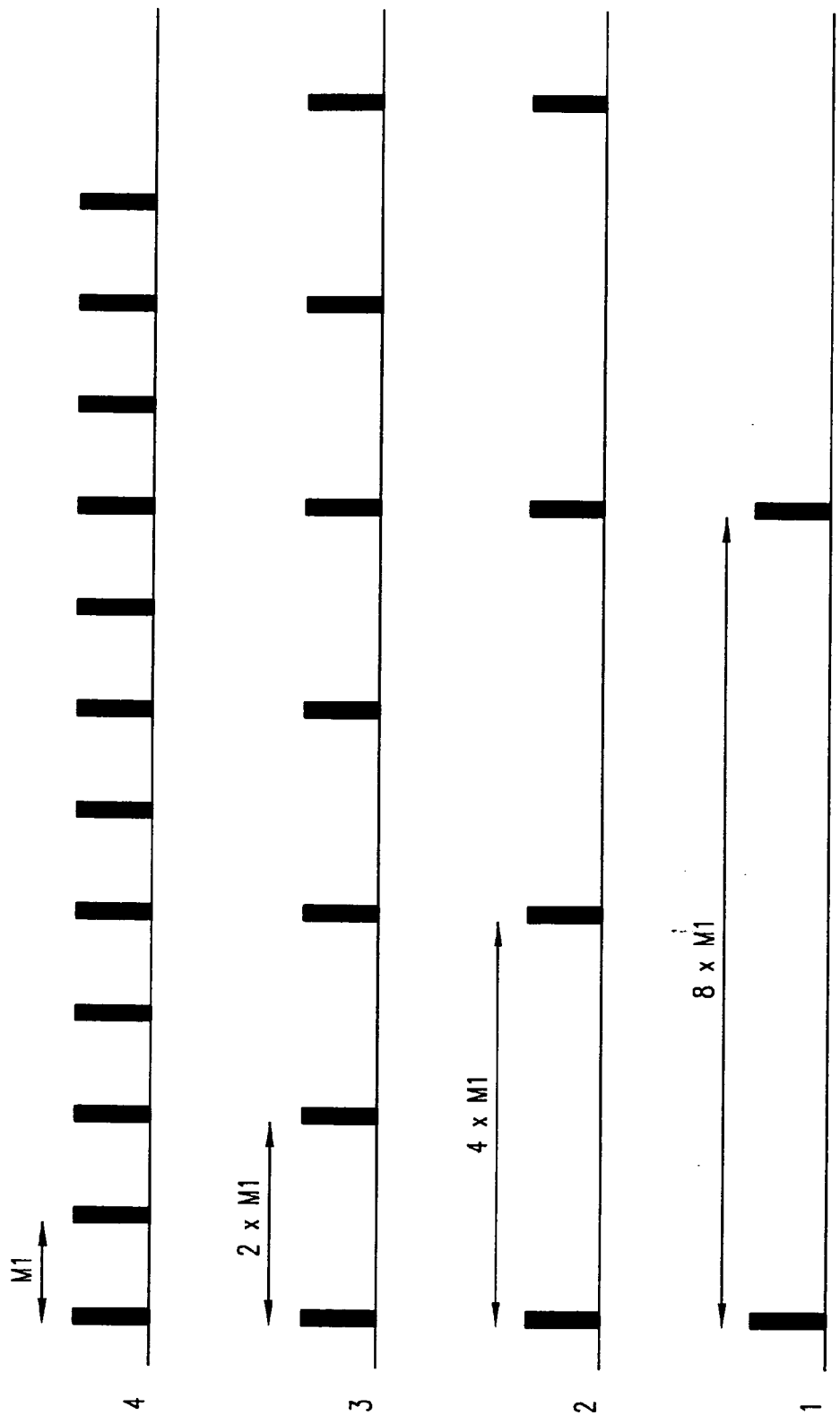
FIG. 7 illustrates exemplary recovery time periods in accordance with the present invention.

Reference is now made to FIG. 7, wherein there are shown exemplary priority slot time periods in accordance with the present invention. FIG. 7 illustrates an example with four restart period schemes. Units can switch from one period scheme to the other. The units do not have to switch simultaneously, provided: 1) the schemes are aligned so that the start point of a lower scheme (longer period) coincides with a start point in all higher schemes (shorter period); and 2) the restart timing is based on absolute slot numbers. The latter means that the priority slots follow:

$$TX \bmod (2^k \times M1) = \text{offset}$$

where k is an integer, M1 is the period of the highest scheme (shortest period), and offset is a fixed slot offset that is the same for all schemes.

TX/RX recovery will always take place, even if the two units are on different restart schemes. In the latter case, the recovery may take a little longer than optimal (when both units are on the same scheme). The criteria to switch from one scheme to the other may, for example, be related to the percentage of retransmitted segments.

Referring again to FIG. 7, period schemes 1–4 are shown, in which the scheme 4 has a period M1, in which M1 represents the period between priority slots in accordance with the present invention. The period schemes 3, 2, and 1 have periods of 2×M1, 4×M1, and 8×M1, respectively. Thus, each of the schemes 3, 2, and 1 has a period that coincides with a start point in all higher schemes.

When more than two units are communicating on a channel, priority slots can be used to control exchange of the token. Priority slots restart the ping-pong protocol among more than two units after failures in a similar fashion as with only two units. If a packet fails, the intended recipient does not know if and when to start transmission. This is because the token has been lost. Priority slots are defined during initialization of the channel and permit a unit to start transmission without waiting for a token. At a priority slot, a receiving unit receives the token by default. None of the other units is allowed to transmit on a priority slot other than the unit that has received the priority slot.

Figure 8:
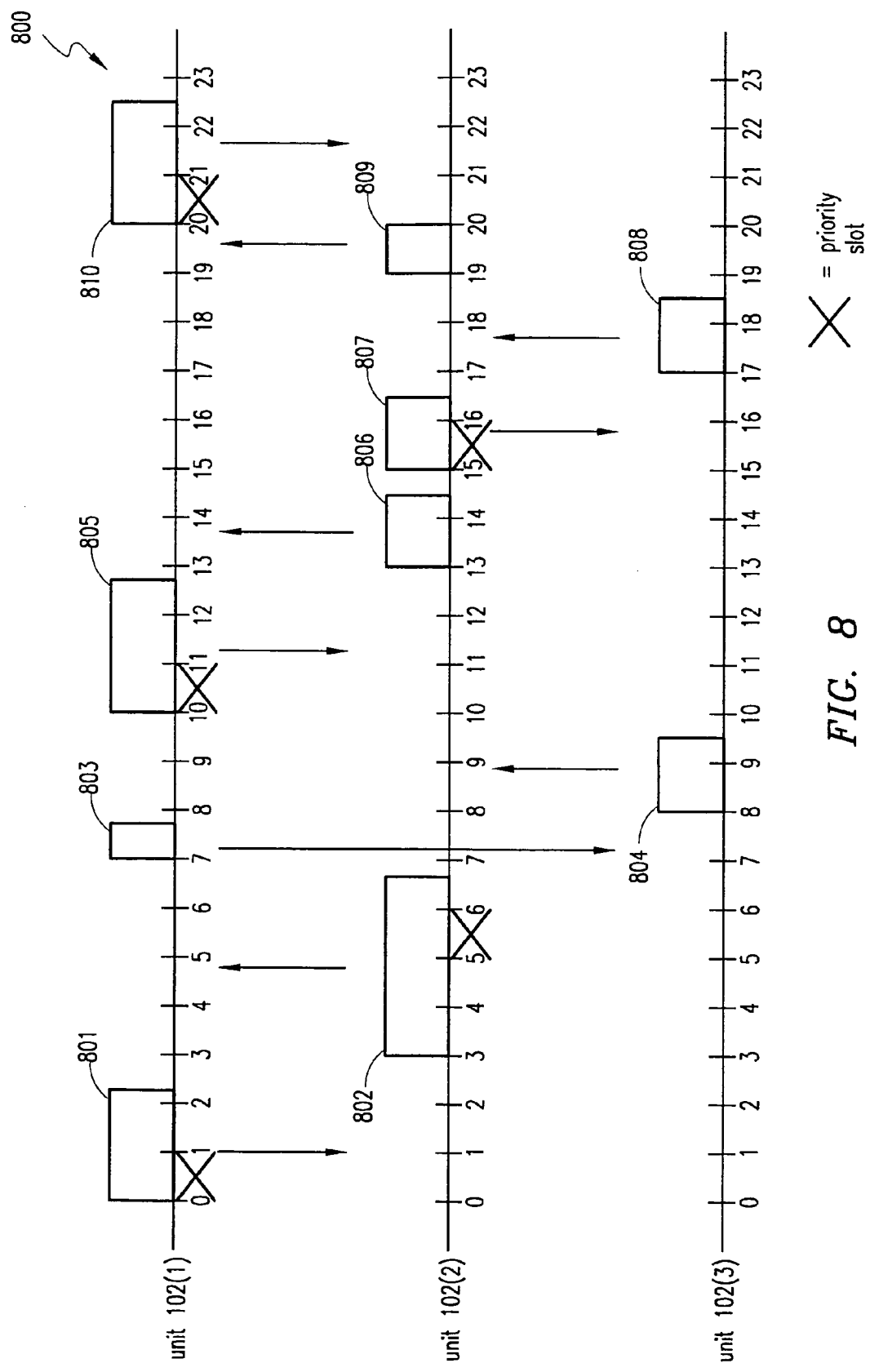
FIG. 8 illustrates exemplary operation of a token ping-pong scheme among more than two units using priority slots in accordance with the present invention.

Reference is now made to FIG. 8, wherein there is shown exemplary operation of a token ping-pong scheme among more than two units using priority slots in accordance with the present invention. A channel 800 is shown with slots 0–23. The units 102(1), 102(2), and 102(3) are communicating with one another on the channel 800. The unit 102(1) has priority slots at the slots 0, 10, and 20. The unit 102(2) has priority slots at the slots 5 and 15. The unit 102(3) does not have priority slots.

Even if a unit receives a packet and therefore implicitly receives the token, it will lose the token if the next slot is a priority slot of another unit. If the intervals for priority slots for different units are not identical, on occasion two or more priority slots could coincide. When this occurs, the unit with the highest priority gets the token. Most typically, priorities among units in the event of priority slot coincidences are assigned during initialization.

One of the units can be assigned a master unit role. If a unit has no packet to send when it receives the token, it can send the token to the master unit; the master unit can then send the token to any other unit in the network. Most often the master unit will have more knowledge about the units' needs than any individual unit.

Referring again to FIG. 8, at the beginning of the slot 0, which is a priority slot for the unit 102(1), the unit 102(1) sends a packet 801 to the unit 102(2). The unit 102(2), which now has the token, sends a packet 802 to the unit 102(1). Since the slot 5, which is a priority slot for the unit 102(2), occurs while the unit 102(2) is sending a packet to the unit 102(1), occurrence of the slot 5 does not impact the ping-pong protocol in any way. This is because the unit 102(2) already has the token and is sending a packet when its priority slot (i.e., the slot 5) occurs.

At the boundary of the slot 7, the unit 102(1), which now has the token, begins to transmit a packet 803 to the unit 102(3). The unit 102(3), which now has the token, sends a packet 804 to the unit 102(2). Following receipt of the packet 804, the unit 102(2) would normally have the token and would be able to transmit according to the ping-pong protocol. However, at the boundary of the slot 10, the unit 102(1) receives the token, since the slot 10 is a priority slot for the unit 102(1). Therefore, the unit 102(1) can send a packet 805 starting at the boundary of the slot 10. The unit 102(2) cannot send a packet at the boundary of the slot 10 because another unit, the unit 102(1), has a priority slot at the slot 10.

Next the unit 102(1) sends the packet 805 to the unit 102(2). Upon receipt of the packet 805, the unit 102(2) now has the token and can send a packet 806 to the unit 102(1). Upon receipt of the packet 806, the unit 102(1) would normally have the token according to the ping-pong protocol. However, at the slot 15, the unit 102(2) receives the token, since the slot 15 is a priority slot for the unit 102(2). Therefore, the unit 102(2) can send a packet 807 to the unit 102(3). The unit 102(3) now has the token as a result of receiving the packet 807. Next, the unit 102(3) sends a packet 808 to the unit 102(2) beginning at the boundary of the slot 17.

Next, the unit 102(2), which now has the token by virtue of having received the packet 808, sends a packet 809 to the unit 102(1) beginning at the boundary of the slot 19. The unit 102(1) thus obtains the token and can send a packet 810 to the unit 102(2). Further, even if the unit 102(1) had not received the token by virtue of its receipt of the packet 809 from the unit 102(2), the unit 102(1) would have been able to send the packet 810 beginning at the boundary of the slot 20 because the slot 21 is a priority slot for the unit 102(1).

Reference is now made to FIG. 9, wherein is shown exemplary operation of a token ping-pong protocol in a broadcast service in accordance with the present invention. The units 102(1), 102(2), and 102(3) are shown communicating on a channel 11000. The channel 1000 has slots 0–24. The slots 0, 7, and 14 are priority slots for the unit 102(1). The slots 5, 12, and 19 are priority slots for the unit 102(2). The slots 4, 11, and 18 are priority slots for the unit 102(3). Priority slots are indicated by an X for each of the units 102(1), 102(2), and 102(3). The channel 1000 is a broadcast channel that can be used by the unit 102(1) to send information securely to the units 102(2) and 102(3), as described in a U.S. patent application by J. C. Haartsen, entitled Retransmission for Broadcast Information, bearing Ser. No. 09/660,409 and filed on Sep. 12, 2000, which is incorporated by reference herein for all purposes.

In FIG. 9, the unit 102(1) is the master unit, while the units 102(2) and 102(3) are slave units. At the boundary of the slot 0, which is a priority slot for the unit 102(1), the unit 102(1) begins to broadcast a packet 901 to both the unit 102(2) and the unit 102(3). The packet 901 occupies the entirety of the slots 0–2 and part of the slot 3. At the boundary of the slot 4, which is a priority slot for the unit 102(3), the unit 102(3) responds to the unit 102(1) by sending a packet 902. The packet 902 contains only ACK/NAK information, which information is preferably processed as described in the U.S. patent application entitled Retransmission for Broadcast Information, filed Sep. 12, 2000.

At the boundary of the slot 5, which is a priority slot for the unit 102(2), the unit 102(2) sends a packet 903 to the unit 102(1), which packet contains only ACK/NAK information.

At the boundary of the slot 7, the unit 102(1) sends a packet 904 to both the unit 102(2) and the unit 102(3). The slot 7 is a priority slot for the unit 102(1). Beginning at the boundary of the slots 11 and 12, respectively, the units 102(3) and 102(2) send packets 905 and 906, respectively, in response to transmission by the unit 102(1) of the packet 904.

At the boundary of the slot 14, which is a priority slot for the unit 102(1), the unit 102(1) broadcasts a packet 907 to both the unit 102(2) and the unit 102(3). In response to receipt of the packet 907, the unit 102(3), beginning at the boundary of the slot 18, sends a packet 908 to the unit 102(1). The unit 102(2) responds to receipt of the packet 907 beginning at the boundary of the slot 19 by sending to the unit 102(1) a packet 909.

It can thus be seen from FIG. 9 that a master unit can broadcast packets to more than one slave units and that the slave units can each respond to the packets broadcasted to them by the master unit. In addition, priority slots can be used to provide each of the units with an opportunity to send a packet regardless of whether the unit has received a packet in accordance with the ping-pong protocol.

Figure 10:
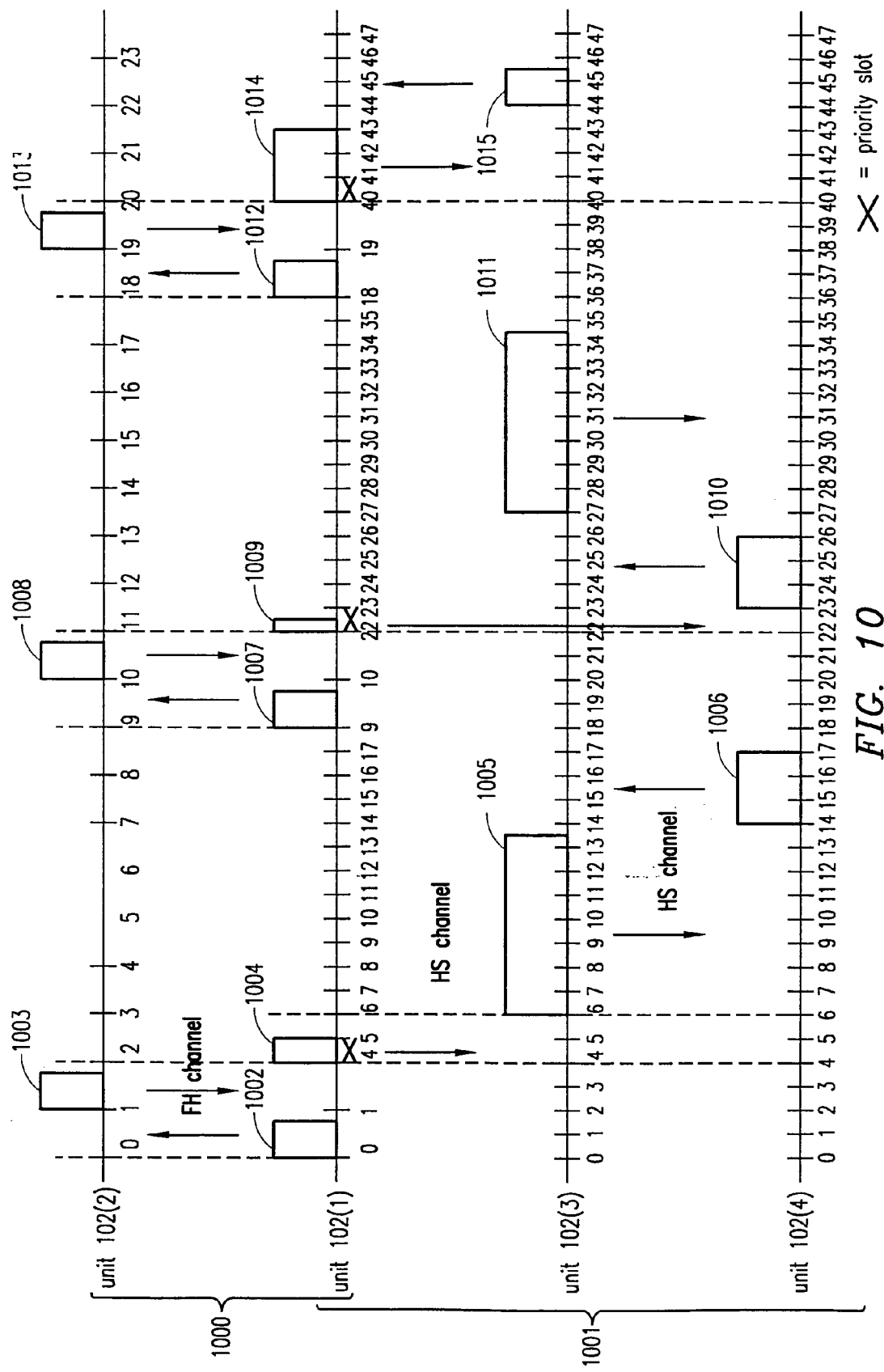
FIG. 10 illustrates exemplary operation of a token ping-pong scheme on a high-speed channel interacting with a FH channel in accordance with the present invention.

Reference is now made to FIG. 10, wherein is shown exemplary operation of a token ping-pong protocol on a high speed (HS) channel interacting with a frequency-hopping (FH) channel in accordance with the present invention. The unit 102(1) is the master of a FH Piconet, such as those based on the Bluetooth™ system. The unit 102(1) communicates with the unit 102(2) on a FH channel 1000. The unit 102(1) also communicates with the unit 102(3) and a unit 102(4) on a high-speed (HS) channel 1001. To permit interaction between the FH channel 1000 and the HS channel 1001, priority slots of the master unit 102(1) are aligned with the slots of the FH channel 1000.

The token is always returned to the master unit 102(1), the master unit 102(1) being the master of both the FH channel 1000 and the HS channel 1001. Each of the units can have, for example, a dual-mode radio capable of switching between the FH channel 1000 and the HS channel 1001. The HS channel 1001 slave units 102(3) and 102(4) can periodically listen to the master unit 102(1) on the FH channel 1000 in order to remain in contact with the FH Piconet. If an HS channel such as HS channel 1001 is employed, such as, for example, in the Bluetooth™ system as described in U.S. patent application Ser. No. 09/385,024, filed Aug. 30, 1999, which is incorporated by reference herein, a token ping-pong protocol can be used.

Priority slots are chosen so that the master unit 102(1) always receives the token when it returns from the FH channel 1000 to the HS channel 1001. If the master unit 102(1) is not involved in communications on the HS channel 1001, the period between priority slots can be set to a longer interval. The units 102(3) and 102(4) can communicate with one another over the HS channel 1001, while the master unit 102(1) communicates with the unit 102(2) over the FH channel 1000. During times that the unit 102(1) is communicating with the unit 102(2) on the FH channel 1000, the unit 102(1) cannot be reached by the unit 102(3) or the unit 102(4).

The FH channel 1000 has FH channel slots 0–23. The HS channel 1001 has HS channel slots 0–47. The unit 102(1) initially communicates on the FH channel 1000 by beginning transmission of a packet 1002 at the boundary of the FH slot 0. The unit 102(2) responds to the unit 1021 by transmitting a packet 1003 beginning at the boundary of the FH channel slot 1. Next, at the boundary of the HS channel slot 4, the unit 102(1) receives the token by virtue of the fact that the HS channel slot 4 is a priority slot for the unit 102(1). The unit 102(1), which is the master unit of both the FH channel 1000 and of the HS channel 1001, is the only unit that has priority slots. Next, the unit 102(1) returns to the HS channel 1001, and, upon returning to the HS channel 1001, receives the token in the form of a priority slot, which is the HS channel slot 4.

At the boundary of the HS channel slot 4, the unit 102(1) begins to transmit a packet 1004 to the unit 102(3). Upon receipt of the packet 1004, the unit 102(3) now has the token and can begin to transmit a packet 1005 at the boundary of the HS channel slot 6 to the unit 102(4). Upon receipt of the packet 1005, the unit 102(4) receives the token and begins to transmit a packet 1006 to the unit 102(3) on the HS channel 1001 to the unit 102(3). At the FH channel slot 9, the unit 102(1) is communicating on the FH channel 1000 with the unit 102(2). At the boundary of the slot 9, the unit 102(1) begins to send a packet 1007 to the unit 102(2). In response to receipt of the packet 1007, the unit 102(2) has the token and begins to transmit a packet 1008 to the unit 102(1) at the boundary of the FH channel slot 10. Next, the unit 102(1) returns to the HS channel 1001 and, upon returning to the HS channel 1001, has the token and can transmit a packet 1009 beginning at the boundary of the HS channel slot 22. The packet 1009 is transmitted to the unit 102(4) on the HS channel 1001. Upon receipt of the packet 1009, the unit 102(4) has the token and begins to transmit a packet 1010 at the boundary of the slot 23. Upon receipt of the packet 1010, the unit 102(3) has the token and begins to transmit a packet 1011 at the boundary of the slot of the HS channel slot 27 to the unit 102(4).

At the boundary of the FH channel slot 18, the unit 102(1) begins to transmit a packet 1012 to the unit 102(2), the unit 102(1) having returned to the FH channel 1000 in order to communicate with the unit 102(2). Upon receipt of the packet 1012, the unit 102(2) receives the token and can begin to transmit a packet 1013 at the boundary of the FH channel slot 19. At the boundary of the HS channel slot 40, the unit 102(1) begins to transmit a packet 1014, the unit 102(1) having returned to the HS channel 1001. Upon receipt of the packet 1014, the unit 102(3) has the token and begins to transmit a packet 1015 at the boundary of the HS channel slot 44.

It can thus be seen from FIG. 10 that the present invention can be implemented in a system using the token ping-pong protocol on a high-speed channel interacting with a frequency-hopping channel. Priority slots can be aligned with slots of the frequency-hopping channel and/or the high-speed channel and can allow a master unit to communicate with slave units on both the frequency-hopping channel and the high-speed channel.

Figure 11:
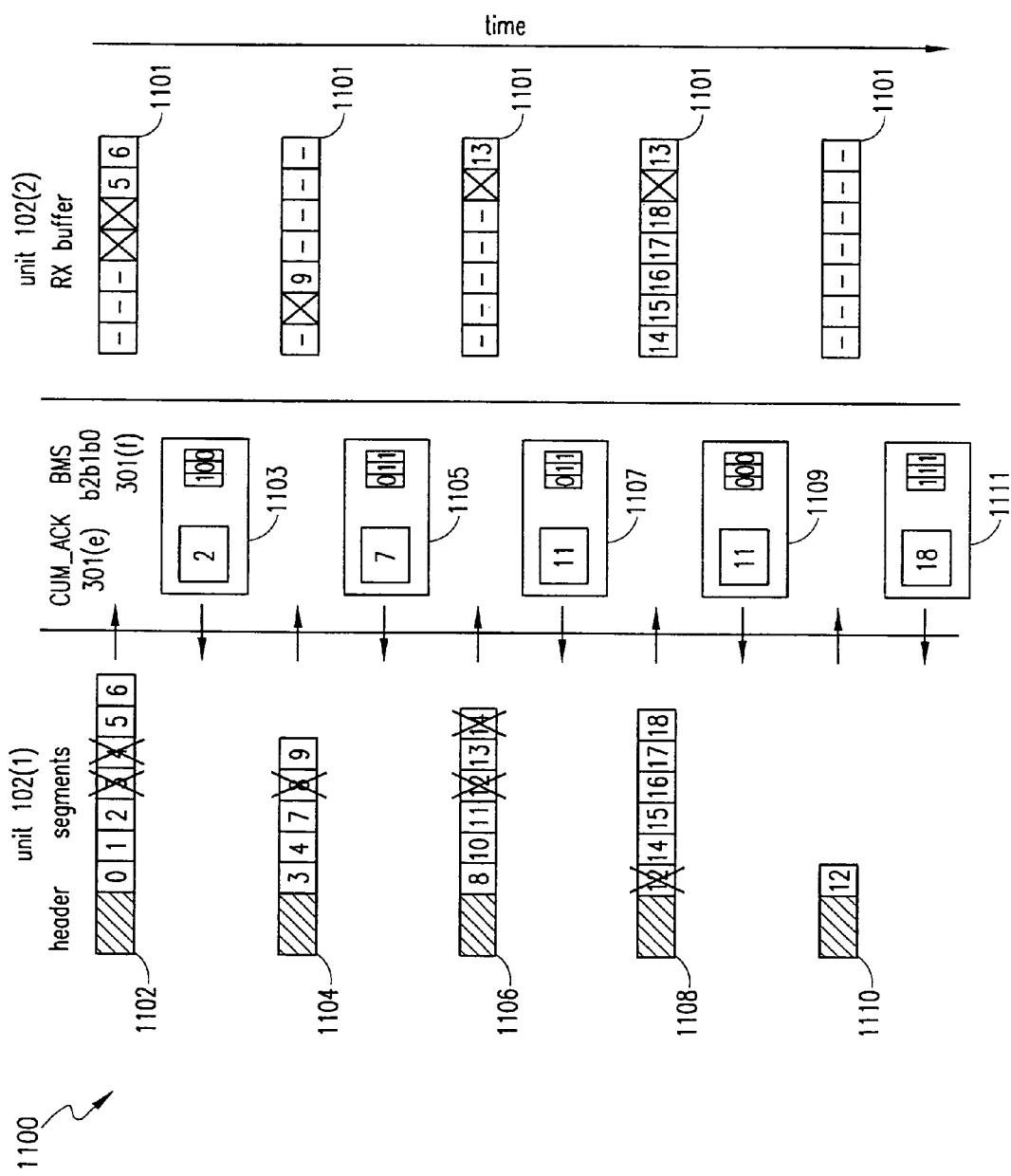
FIG. 11 illustrates an exemplary selective-repeat ARQ process in accordance with the present invention.

Reference is now made to FIG. 11, wherein there is shown an exemplary selective-repeat ARQ process in accordance with the present invention. A selective-repeat process 1100 is illustrated between the unit 102(1) and the unit 102(2). Packets, including segments 0–18 of payload data, transmitted from the unit 102(1) to the unit 102(2) are shown, while only the CUM_ACK field **301(*e*) and BMS field 301(*f*) of return packets sent from the unit 102(2) to the unit 102(1) are shown. Transmissions in each direction are handled identically. A receive (RX) buffer 1101 of the unit 102(2)** is also shown.

In the process 1100, L_tx_102(1)=9, L_rx_102(2)=7, M=32, and the BMS field **301(*f*) contains 3 bits. It is assumed that only the unit 102(1) has segments to send. The header 301 of each packet contains the CUM_ACK field 301(*e*) and the 3-bit BMS field 301(*f*). Other information that can reside in the header is not shown. For the packets sent by the unit 102(2), only the packet header 301 is shown. There might or might not be a payload sent by the unit 102(2), but this is not shown. The packets are sent sequentially in time. The initial value of the CUM_ACK field 301(*e*) is −1 (or M−1=31 if the wrap around procedure is taken into account). The unit 102(1) can send up to 7 segments (i.e., segments 0–6**) at a time because SN_max=min(CUM_ACK+L_tx_102(1), CUM_ACK+L_rx_102(2))=min(−1+9,−1+7)=6. Since in this case the RX buffer limits performance (L_tx_102(1) >L_rx_102(2)), only this buffer will be considered.

Initially, the unit 102(1) sends a packet 1102 to the unit 102(2). The packet 1102 contains the segments 0–6. The segments 3 and 4 fail because of errors. The unit 102(2) receives the segments 0, 1 and 2 in sequential order and can therefore send them to a higher layer; they do not have to be stored. The unit 102(2) stores the segments 5 and 6 in its RX buffer 1101 since the segments 3 and 4 have not been received correctly yet. The RX buffer 1101 contents reflect its status after segments received in sequential order have been released to a higher layer.

Next, the unit 102(2) sends a packet 1103 to the unit 102(1), whereby it acknowledges receipt of the segments 0–2 and implicitly requests retransmission of the segment 3 by the CUM_ACK field **301(*e*)=2. The BMS field 301(*f*) of the packet 1103 indicates that the segment 4 is incorrect, since a 1 in the BMS field 301(*f*) indicates that the segment has not been received correctly. The BMS field 301(*f*) is interpreted such that a left-most bit position b2 relates to segment Request Number+1 (i.e., CUM_ACK+2), a middle bit position b1 to Request Number+2 (i.e., CUM_ACK+3), and a right-most bit position b0 to Request Number+3 (i.e., CUM_ACK+4). In the example, the value b2=1 indicates that the segment 4 has failed, whereas b1=0 and b0=0 indicate successful transmission of the segments 5 and 6**, respectively.

In response to receipt of the packet 1103, the unit 102(1) re-sends the segments 3 and 4 via a packet 1104, but since CUM_ACK=2, the RX buffer 1101 in the unit 102(2) has extra room and can therefore receive segments up to CUM_ACK+L_rx_102(2)=2+7=9. Since the unit 102(1) has already sent the segments 5 and 6, it transmits the segments 7, 8 and 9 in addition to the previously failed segments 3 and 4.

In the transmission of the packet 1104, the segment 8 fails. The unit 102(2) has now correctly received segments up to the segment 7 and can release the segments 5–7; only the segment 9 has to be stored by the RX buffer 1101. In response to receipt of the packet 1104, the unit 102(2) sends a packet 405. In a packet 1105, the CUM_ACK field **301(*e*)=7, which indicates that the segment 8 failed. The BMS field 301(*e*) of the packet 1105 indicates that the segment 9 has been received and that the segments 10 and 11 have not been received correctly, because the segments 10 and 11** have not been sent yet and not because of errors.

In response to receipt of the packet 1105, the unit 102(1) sends a packet 1106, in which the unit 102(1) retransmits the segment 8 and sends up to the segment 14, since SN_max=CUM_ACK+L_rx_102(2)=7+7=14. Since the segment 9 has already been sent, it is skipped. In transmission of the packet 1106, the segments 12 and 14 fail. Segments up to the segment 11 have been received correctly by the unit 102(2) and can therefore be removed from the RX buffer 1101. Only the segment 13 is stored by the unit 102(1). In response to the receipt of the packet 1106, the unit 102(2) sends a packet 1107, in which the CUM_ACK field 301(*e*)=11 and the BMS field 301(*f*) indicate that the segments 14 and 15 were received incorrectly.

In response to receipt of the packet 1107, the unit 102(1) sends a packet 1108, in which the segments 12 and 14 are resent and the segments 15–18 are sent. The segment 12 fails again. The RX buffer 1101 is now full except for the location reserved for the segment 12. All the segments presently in the RX buffer 1101 up to the segment 18 (i.e., the segments 13–18) must be stored and remain in the RX buffer 1101 since the segment 12 has not yet been received correctly. The unit 102(2) replies to the unit 102(1) with a packet 1109, in which the CUM_ACK field 301(*e*)=11, but the BMS field 301(*f*) shows no additional errors, indicating that the segments 13, 14, and 15 have been received successfully. The unit 102(1) has no information regarding the segments 16, 17 and 18 since they are outside the window of the CUM_ACK field 301(*e*) and the BMS field 301(*f*).

The unit 102(1) responds to receipt of the packet 1109 by re-sending the segment 12 in a packet 1110. Since the highest possible segment, the segment 18, (SN_max=11+7=18) has already been sent, no other segments are sent. The RX buffer 1101 of the unit 102(2) is assumed to be full (which it is), and no indication has been given that a retransmission is required for any of the segments from the segments 13–18.

The segment 12 is correctly received by the RX buffer 1101 and the RX buffer 1101 can now be emptied. In response to receipt of the packet 1110, the unit 102(2) sends a packet 1111, in which the CUM_ACK field 301(*e*)=18 and the BMS field 301(*f*) indicate that the segments 20, 21 and 22 have not been received. The unit 102(1) can now send 7 new segments.

Thus, FIG. 11 shows how the selective-repeat ARQ protocol takes into account the buffer size of the RX buffer 1101. Segments are sent only when it is certain that the recipient can store the segments, thus preventing wasteful transmissions. A similar example could be given when a transmit (TX) buffer limits the number of segments sent. Its operation would be apparent to those skilled in the art upon their reading the description of FIG. 11. Because the ARQ protocol takes into account the RX buffer 1101 size, the packet size varies considerably from one segment when the buffer is full, to L_rx_102(2) segments when the buffer is completely empty. The ping-pong protocol adjusts to the varying packet sizes that result from the ARQ protocol by permitting a given unit that receives a small packet to transmit sooner than if it had received a larger packet, which adjustments help to prevent wasted overhead as is common in fixed-frame schemes.

FIG. 11 also shows that the repetition interval is decreased between retransmissions of a segment that repeatedly fails. This is because the packet length is automatically reduced when one segment repeatedly fails. Eventually, only this segment will be retransmitted. Because of the short packets, the retransmission rate increases. This means that this scheme continuously optimizes the latency of the overall system. Segments with low sequence numbers that prevent the sequence of segments from being released to higher layers are given a higher retransmit priority (i.e., they can be retransmitted more often per unit time).

If, for bandwidth allocation and/or delay reasons, the packet size must be limited during negotiations to a number smaller than L_rx_102(2) or L_tx_102(1), SN_max need not be limited to min(CUM_ACK+L_tx_102(1), CUM_ACK+L_rx_102(2)) but can be set to some other value CUM_ACK+X in which X is smaller than either L_tx_102(1) or L_rx_102(2). This limits the size of packets sent by the unit 102(1) to some lower number and prevents the unit 102(2) from taking too much capacity at once from the channel.

In FIG. 11, it is assumed that the unit 102(2) can empty part of the RX buffer 1101 when the segment contents are in sequential order. But it may not always be possible to empty the RX buffer 1101, even when the contents are in sequential order. The higher layers may not be able to accept information at a certain point in time. Therefore, a flow bit (not shown) can be added to the packet header to indicate that all packets have been received correctly, but no new segments can be received yet. To support the ARQ protocol of the present invention, which results in highly variable packet sizes, bandwidth allocation must be flexible. This can be accomplished by including the payload length (in bytes or in segments) in the packet header, as described in FIG. 3. When a packet is sent, a recipient can determine how long the packet is and when it can respond to the sender. After the packet has been sent, the sender must wait for the recipient to respond.

Reference is made to the unpublished document entitled "BLUETONGUE—The High-Speed Bluetooth™ Mode," which describes in general the principles of the present invention and is incorporated herein as Appendix "A."

Although preferred embodiments of the method and system of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A system operable to use a ping-pong protocol in order to remain as flexible as possible during traffic allocation, the system comprising:
    a first unit;
    a second unit, wherein the first unit is operable to transmit a first packet including a first length indicator toward the second unit, and wherein the second unit is operable to receive the first packet and then is operable to transmit a second packet including a second length indicator towards the first unit; and
    wherein the first length indicator relates to a length of the first packet and the second length indicator relates to a length of the second packet, and wherein the timing of the transmission of the second packet is based on data of the first length indicator.

2. A system operable to use a ping-pong protocol in order to remain as flexible as possible during traffic allocation, the system comprising:
    a first unit having a first address;
    a second unit having a second address; and
    a third unit having a third address, wherein the first unit is operable to transmit a first packet including a first length indicator toward the second unit or the third unit, and wherein at least one of the second unit and the third unit is operable to receive the first packet and then is operable to, upon receipt of the first packet, transmit a second packet including a second length indicator; and
    wherein the first length indicator relates to a length of the first packet and the second length indicator relates to a length of the second packet, and wherein the timing of the transmission of the second packet is based on data of the first length indicator.

3. The system of claim 1 or claim 2 wherein the units are further operable to use a selective-repeat ARQ scheme.

4. The system of claim 1 or claim 2 wherein the units continue to transmit and receive additional packets, each of which has a length indicator.

5. The system of claim 4 wherein the first packet, the second packet and the additional packets each start at a respective slot boundary within a slotted time division duplex communication channel.

6. The system of claim 2 wherein each of the packets includes an address of one of the units, the address being used to determine to which of the units each of the packets is transmitted toward.

7. The system of claim 1 or claim 2 wherein the first unit is assigned a master unit role and is further operable to restart transmission operations using priority slots.

8. The system of claim 7 wherein the priority slots have an interval that may be dynamically increased or dynamically decreased depending on error conditions.

9. The system of claim 1 wherein the first unit is further operable to restart transmission operations using first priority slots, and the second unit is further operable to restart transmission operations using second priority slots.

10. The system of claim 2 wherein the first unit is further operable to restart transmission operations using first priority slots, and the second unit is further operable to restart transmission operations using second priority slots.

11. The system of claim 9 or claim 10 wherein an interval of the first priority slots is less than an interval of the second priority slots.

12. The system of claim 10 wherein the third unit is further operable to restart transmission operations using third priority slots.

13. The system of claim 12 wherein an interval of the first priority slots is less than an interval of the second priority slots and is less than an interval of the third priority slots.

14. The system of claim 12 wherein the first priority slots and the second priority slots both have the same intervals but are time-staggered.

15. The system of claim 14 wherein the third priority slots have the same intervals as the first priority slots and the second priority slots, but the first priority slots, the second priority slots, and the third priority slots are time-staggered from one another.

16. The system of claim 15 wherein the first priority slots have intervals that may be dynamically increased or dynamically decreased depending on error conditions.

17. A method for using a ping-pong protocol to enable flexible traffic allocation between a first unit and a second unit, the method comprising the steps of:
    transmitting from the first unit a first packet including a first length indicator, wherein the first length indicator relates to a length of the first packet;
    receiving the first packet at the second unit;
    transmitting from the second unit a second packet including a second length indicator, wherein the second length indicator relates to a length of the second packet, and wherein the timing of the step of transmitting is based on data of the first length indicator; and
    receiving the second packet at the first unit.

18. A method for using a ping-pong protocol to enable flexible traffic allocation among a first unit, a second unit, and a third unit, the method comprising the steps of:
    transmitting from the first unit a first packet including a first length indicator, the packet being directed toward the second unit, the second unit being identified in the first packet;
    receiving the first packet at the second unit; and
    transmitting from the second unit a second packet including a second length indicator.

19. The method of claim 18 wherein the second packet is directed toward the first unit, the first unit being identified in the second packet.

20. The method of claim 19 further comprising the step of receiving the second packet at the first unit.

21. The method of claim 20 wherein each of the packets includes an address of one of the units, the address being used to determine to which of the units each of the packets is directed toward.

22. The method of claim 18 wherein the second packet is directed toward the third unit, the third unit being identified in the second packet.

23. The method of claim 22 further comprising the step of receiving the second packet at the third unit.

24. The method of claim 23 wherein each of the packets includes an address of one of the units, the address being used to determine to which of the units each of the packets is directed toward.

25. The method of claim 18, further comprising the step of using a selective-repeat scheme among the units.

26. The method of claim 25, further comprising the steps of restarting transmission operations within the first unit at first priority slots, and restarting transmission operations within the second unit at second priority slots.

27. The method of claim 26, further comprising the steps of restarting transmission operations within the third unit at third priority slots.

28. The method of claim 27 wherein the first priority slots, the second priority slots, and the third priority slots each have the same intervals but are time-staggered.

29. The method of claim 28 wherein the first priority slots, the second priority slots, and the third priority slots each have intervals that may be dynamically increased or dynamically decreased depending on error conditions.

30. The method of claim 25 wherein the first priority slots and the second priority slots both have the same intervals but are time-staggered.

31. The method of claim 30 wherein the first priority slots and the second priority slots both have intervals that may be dynamically increased or dynamically decreased depending on error conditions.

32. The method of claim 17 or claim 18, further comprising the step of continuing the steps of transmitting and receiving among the units using additional packets, each of which has a length indicator.

33. The method of claim 32, further comprising the steps of starting the transmission of each of the first packet, the second packet, and the additional packets at a slot boundary within a slotted time division duplex communication channel.

34. The method of claim 17 or claim 18, further comprising the steps of assigning a master unit role to the first unit and restarting transmission operations within the first unit at priority slots.

35. The method of claim 34 wherein the priority slots have an interval that may be dynamically increased or dynamically decreased depending on error conditions.

36. A system operable to use a selective-repeat ARQ scheme to provide data integrity in an error-prone communications environment, the system comprising:
    a first unit operable to use a ping-pong protocol;
    a second unit operable to use the ping-pong protocol, wherein the first unit is operable to transmit a first packet including at least one segment towards the second unit, and wherein the second unit is operable to receive all or a portion of the first packet and then is operable to transmit a second packet including acknowledgment information indicating which, if any, of the at least one segment were successfully received by the second unit; and wherein a variable round-trip delay relates to a delay, measured at the first unit, between a time at which the first packet is transmitted and the time at which the second packet is received at the first unit.

37. The system of claim 36 wherein the first unit retransmits at least one of the previously transmitted segments and transmits, if needed, additional segments in a third packet based on the acknowledgment information.

38. The system of claim 36 wherein the round-trip delay between the transmission of the first packet and the reception of the second packet is variable and depends on a size of the first packet and a size of the second packet.

39. The system of claim 36 wherein the size of the first packet or the size of the second packet is no larger than the smaller of a transmit buffer and a receive buffer in each of the first and second units.

40. The system of claim 36 wherein another selective-repeat ARQ scheme works for communications on a link from the second unit to the first unit.

41. The system of claim 36 wherein each segment further includes a distinctive sequence number.

42. The system of claim 38 wherein the acknowledgment information further includes a CUM_ACK field which indicates, using a sequence number, which sequential segments have been successfully received by the second unit.

43. The system of claim 39 wherein the acknowledgment information further includes a Bit Map (BMS) field which indicates the segments with sequence numbers greater than a Request Number that have failed and which have been successfully received by the second unit.

44. The system of claim 36 wherein the second unit is further operable to remove, from a receive buffer, the sequential segments that have been successfully received.

45. The system of claim 36 wherein the segments that are not successfully received by the second unit can be repeatedly retransmitted with a decreasing repetition interval.

46. A method for using a selective-repeat ARQ scheme to provide data integrity in communications between a first unit and a second unit, the method comprising the steps of:

transmitting from the first unit a first packet including at least one segment and receiving all or a portion of the first packet at the second unit;

transmitting from the second unit a second packet including acknowledgment information indicating which, if any, of the at least one segment were successfully received by the second unit; and calculating, at the first unit, a variable round-trip delay based on a time measurement between a time at which the first packet is transmitted and the time at which the second packet is received at the first unit.

47. The method of claim 46 wherein the first and second units are further operable to use a ping-pong protocol.

48. The method of claim 46 wherein a length indicator included in each of the packets is used to determine when a next packet can be sent.

49. The method of claim 46 further comprising the step of transmitting by the first unit of a third packet to the second unit, a number of segments in the third packet being determined based on the acknowledgment information.

50. The method of claim 49 wherein the acknowledgment information enables a determination of a fullness of a receive buffer of the second unit.

51. The method of claim 50 wherein the first unit transmits only segments that can be accepted by the receive buffer of the second unit.

52. The method of claim 47 wherein segments transmitted in the third packet include only segments indicated by the acknowledgment information as having not been received by the second unit in the first packet and any additional segments that can be accepted by a receive buffer of the second unit.

53. The method of claim 46 further comprising the steps of retransmitting from the first unit at least one of the previously transmitted segments and transmitting, if needed, additional segments in a third packet based on the acknowledgment information.

54. The method of claim 53 wherein the round-trip delay between the transmission of the first packet and the reception of the second packet is variable and depends on a size of the first packet and a size of the second packet.

55. The method of claim 54 wherein the size of the first packet or the size of the second packet is no larger than the smaller of a transmit buffer and a receive buffer in each of the first and second units.

56. The method of claim 46 wherein another selective-repeat ARQ scheme works for communications on a link from the second unit to the first unit.

57. The method of claim 46 wherein each segment further includes a distinctive sequence number.

58. The method of claim 57 wherein the acknowledgment information further includes a CUM_ACK field which indicates, using a sequence number, which sequential segments have been successfully received by the second unit.

59. The method of claim 58 wherein the acknowledgment information further includes a Bit Map (BMS) field which indicates the segments with sequence numbers higher than a Request Number that have failed and which have been successfully received by the second unit.

60. The method of claim 46 wherein the second unit is further operable to remove, from a receive buffer, the sequential segments that have been successfully received.

61. The method of claim 46 wherein the segments that are not successfully received by the second unit are repeatedly retransmitted with a decreasing repetition interval.

62. A unit operable to use a ping-pong protocol, the unit comprising:

a receiver for receiving a first packet including a first length indicator from an additional unit; and a transmitter for transmitting a second packet including a second length indicator to the additional unit, wherein the timing of the transmission of the second packet is based on data of the first length indicator.

63. The unit of claim 62, wherein the unit is further operable to use a selective-repeat ARQ scheme.

64. The unit of claim 62, wherein the unit continues to at least one of transmit and receive additional packets, each of the additional packets including a length indicator.

65. The unit of claim 62, wherein the unit is operable in a time division duplex communications scheme.

66. The unit of claim 62, wherein the unit is assigned a slave unit role.

67. The unit of claim 62, wherein the unit is assigned a master unit role.

68. The unit of claim 62, wherein the first packet and the second packet include an address of one of the unit and the additional unit, the address being used to determine to which of the units each of the first packet and the second packet is transmitted.

69. The unit of claim 62, wherein the transmitter and the receiver are operable as a single transceiver unit.

70. The unit of claim 62, wherein transmission operations are restarted at the unit at second priority slots.

* * * * *